(12) United States Patent
Johns et al.

(10) Patent No.: US 8,063,778 B2
(45) Date of Patent: Nov. 22, 2011

(54) DEVICE AND METHOD FOR INDICATING THE CONDITION OF TUBES ON A TUBESHEET

(75) Inventors: Clifford L. Johns, Louisville, KY (US); Guillermo Camoriano, Louisville, KY (US); Bart Nuss, Fisherville, KY (US)

(73) Assignee: Extundo Incorporated, Louisville, KY (US)

( * ) Notice: Subject to any disclaimer, the term of this patent is extended or adjusted under 35 U.S.C. 154(b) by 308 days.

(21) Appl. No.: 12/248,281

(22) Filed: Oct. 9, 2008

(65) Prior Publication Data
US 2009/0095211 A1   Apr. 16, 2009

Related U.S. Application Data

(60) Provisional application No. 60/979,191, filed on Oct. 11, 2007.

(51) Int. Cl.
*G08B 21/00* (2006.01)

(52) U.S. Cl. .................. 340/540; 340/384.7; 340/545.6; 340/568.1; 340/686.6; 340/531; 73/37; 116/201

(58) Field of Classification Search ............... 340/545.6, 340/540, 568.1, 686.6, 531, 384.1, 545.3, 340/815.4; 206/216; 73/37; 116/201
See application file for complete search history.

(56) References Cited

U.S. PATENT DOCUMENTS

| | | | | |
|---|---|---|---|---|
| 4,442,716 | A | * | 4/1984 | Coe et al. ......................... 73/756 |
| 5,439,103 | A | * | 8/1995 | Howes ........................... 206/217 |
| 5,625,347 | A | * | 4/1997 | MacLean et al. ........... 340/568.1 |
| 6,694,802 | B1 | | 2/2004 | Comardo |
| 7,364,089 | B2 | * | 4/2008 | Claessens et al. ............. 235/492 |
| 2004/0243052 | A1 | * | 12/2004 | Kauphusman et al. ......... 604/11 |
| 2008/0111685 | A1 | * | 5/2008 | Olson et al. ................. 340/545.6 |

FOREIGN PATENT DOCUMENTS

| | | |
|---|---|---|
| DE | 10 2005 027 060 | 12/2006 |
| EP | 0 311 712 | 4/1989 |
| EP | 1 967 260 | 9/2008 |
| GB | 725860 | 3/1955 |
| GB | 1 311 434 | 3/1973 |

* cited by examiner

*Primary Examiner* — Hoi Lau
(74) *Attorney, Agent, or Firm* — Camoriano and Associates; Theresa Fritz Camoriano; Guillermo Camoriano

(57) ABSTRACT

A device and method for temporarily plugging and visually identifying the condition of tubes.

2 Claims, 32 Drawing Sheets

DEVICE AND METHOD FOR INDICATING THE CONDITION OF TUBES ON A TUBESHEET

This application claims priority from U.S. Provisional Application Ser. No. 60/979,191 filed Oct. 11, 2007, which is hereby incorporated herein by reference. The present invention relates to a device and method for indicating the condition of tubes on a tubesheet.

BACKGROUND

In a tube and shell heat exchanger, such as a vertical tube chemical reactor, there are various situations in which it is desirable to temporarily plug or indicate the condition of one or more tubes. A temporary plug may be used to protect a tube or catalyst inside the tube, or to identify the condition of the tube, or to aid in keeping track of the work progress on tubes while the reactor is out of service for maintenance. In the prior art, this is usually done by a colored plastic cap or plug inside the top end of each tube, with a particular cap or plug color intended to identify a particular tube condition (such as a tube to be unloaded, cleaned, loaded, pressure-drop tested, tube failed due to high pressure drop, tube failed due to a low pressure drop, tube passed the pressure drop test, tubes that have or will have thermocouples or pressure sensors, or even tubes from which catalyst samples may be removed for laboratory analysis after the catalyst has been used).

This procedure requires large numbers of caps or plugs of different colors to be used as the tubes in the reactor are worked on to indicate the status of particular tubes and to serve as a visual indication of the work flow progress on all of the tubes in the reactor while the tubes are brought to within the desired specifications for cleaning, empty, full, outage, and pressure drop. It is not unusual to run out of different colors to designate the numerous tube conditions, resulting in improvisations by the catalyst changeover crew in order to identify the condition of the tubes. For instance, a cap or plug may be removed from a tube and if pliable enough then twisted and reinserted sideways into the top edge of the tube to designate the new condition of the tube. Sometimes two caps or plugs are stacked on top of each other and inserted into a tube. In both of these cases, the caps or plugs then project awkwardly from the tube and are more prone to being accidentally kicked and dislodged from the tube, so they no longer perform the desired function of visually identifying the tube condition. In the case of the twisted and reinserted cap or plug, it can become lodged down inside the tube if walked upon, such that it may not be easily seen and may even unknowingly be left behind.

In order to prevent the caps or plugs from being accidentally dislodged from, or pushed down into the tubes, they usually are designed to fit snugly inside the tubes. Some caps or plugs are simple pipe thread protectors that are applied to protect the threads on the ends of threaded pipes that use a tapered thread like those available from Caplugs from Buffalo, N.Y. (www.caplugs.com). Since these devices are tapered, they can be pushed very securely into a tube. Upper tubesheets with caps or plugs in them are continuously walked upon by the catalyst change crew, and heavy machines and supplies are temporarily located and moved across this upper tube sheet, forcing the caps or plugs securely into the tubes.

Cap or plug size availability is often somewhat limited, as these caps or plugs are sized for commercially sized pipe threads, although custom sizes could be used. Reactor tube inner diameters are seldom standard pipe sizes, and instead are often custom sized to optimize heat transfer. In the case of tight fitting tapered caps or plugs, this results in two problems. First, the tight wedging action of the tapered cap or plug within or upon the tube makes it very difficult to remove the cap or plug from the tube, so it usually is pried but with a screwdriver, which may damage the cap or plug and may even score the inside wall of the tube. Second, after a cap or plug which has been removed and reinserted a number of times may become; cut or otherwise damaged by the blade of a screw driver, or by being removed by narrow end (needle nose) pliers, it may no longer fit snugly inside the tube, making it more prone to being accidentally kicked out or otherwise, dislodged from its tube, or it may be damaged so that it is no longer serviceable.

Tape, such as duct tape, can be attached to the caps or plugs in certain tubes in order to identify them (this tape may be accidentally scuffed off or otherwise removed from its corresponding cap or plug). Sometimes caps or plugs are actually taped to the tubesheet (resulting in art undesirable sticky residue on the tubesheet when the tape is removed).

Most tube caps or plugs, such as those intended to protect the threads on the ends of pipes, include an open cavity or depression where dirt, catalyst and foreign material can accumulate. It can be difficult and time consuming to remove the dirt, spilled catalyst and foreign material from these cavities, especially when many thousands of such caps or plugs are used.

Some tube plugs have a flat top (do not include an open cavity) but they incorporate a tapered body that fits snugly into the tubes and require a screw driver or fork device to remove them, making them time consuming and sometimes difficult to install and remove. Other plugs have a flat top but have a loose fitting body so they effectively float around in the tube. These plugs are relatively easy to install and remove, but they do not seal the tube from air flow, and they are sometimes inadvertently removed while walking across them or by moving equipment across them. Since reactors are often made of carbon steel, the reactor is often kept warm to prevent condensation that could lead to iron oxide formation. Also, it is desirable to keep most catalyst pellets that have been loaded dry and away from moisture. The warm vertical tubes in the reactor vessel may induce natural convection air flow through the tubes, and this may be undesirable as the air being supplied to the bottom of the tube could be moisture-laden ambient air. Another reason for minimizing or eliminating this natural convection phenomenon is that some catalyst can off-gas certain chemicals which can be annoying and even hazardous for the catalyst handling crew. Also, convection air flow can raise the ambient temperature in the dome area above the tubesheet, making it uncomfortable for the catalyst handling personnel. Loose fitting plastic caps with or without recesses or plugs with flat tops can slow down the convection air flow, but they do not stop it.

DESCRIPTION

Figure 1:
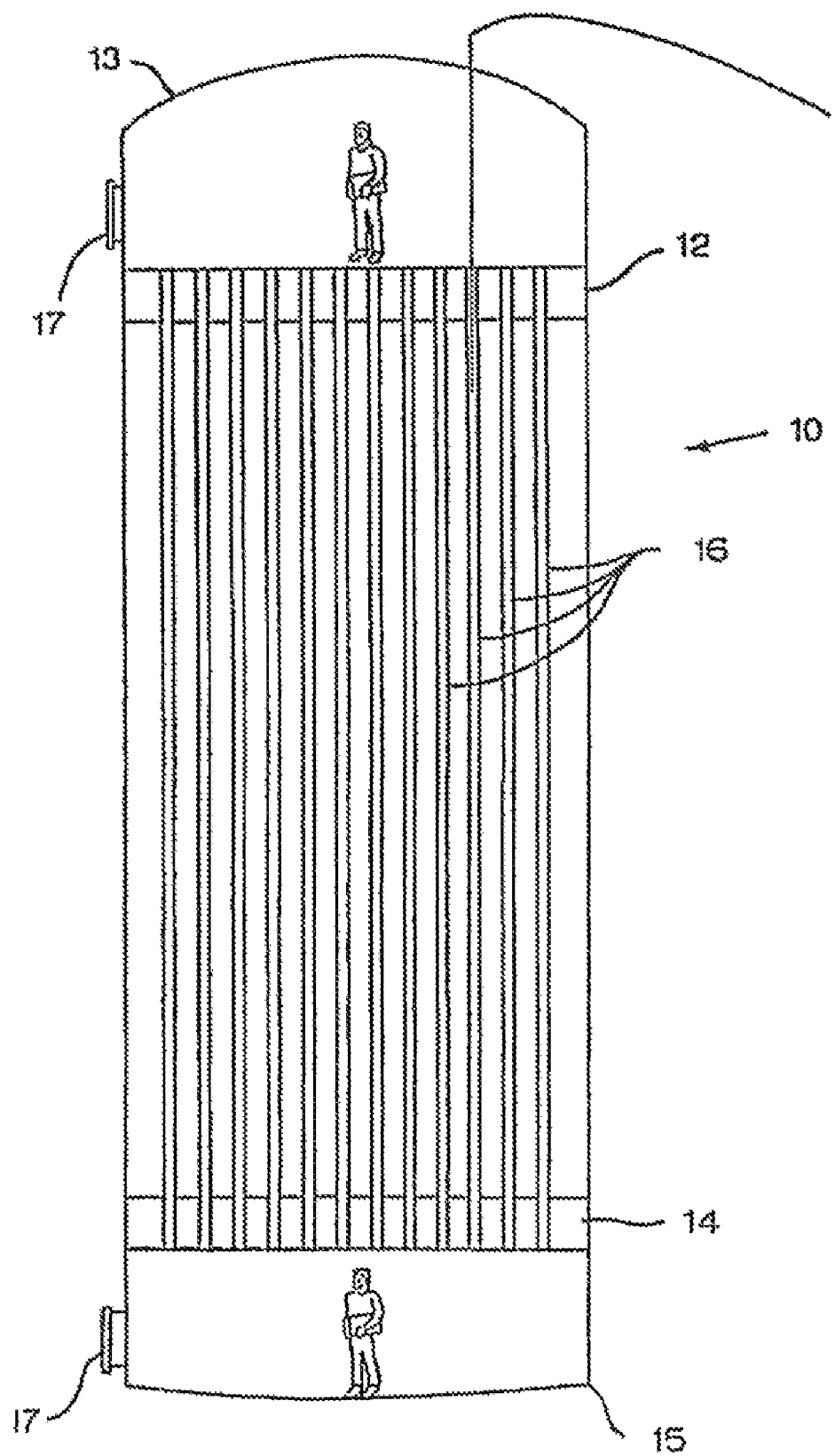
FIG. 1 is a schematic section view of a chemical reactor including a shell and a plurality of vertical tubes.
Figure 2:
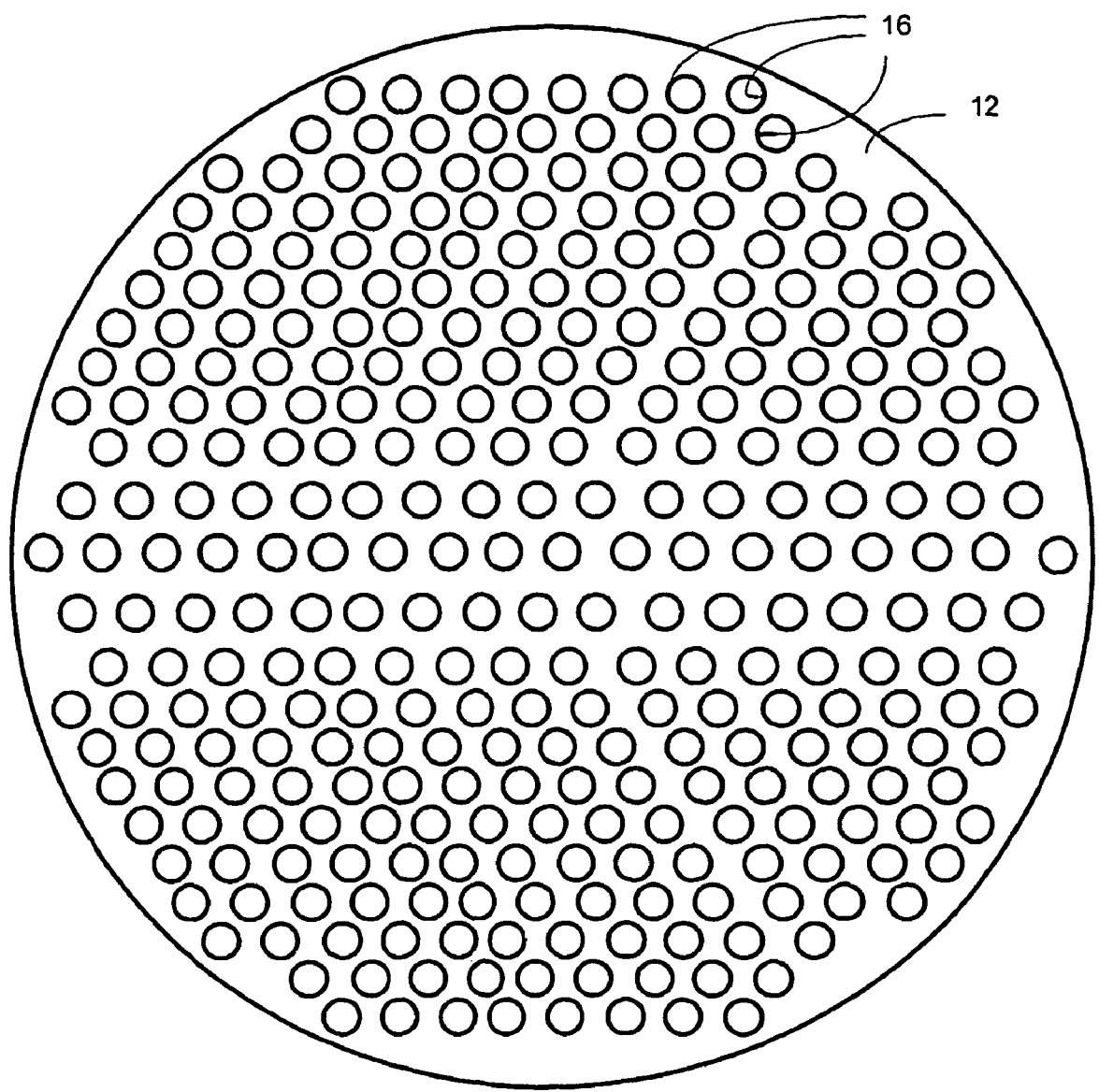
FIG. 2 is a top view of the tubesheet of the reactor of FIG. 1.

FIG. 1 depicts a chemical reactor vessel 10, which is a shell and tube heat exchanger, having a top tubesheet 12 and a bottom tubesheet 14, with a plurality of tubes 16 welded or expanded to the tubesheet 12 in a triangular pitch arrangement as shown in FIG. 2, to form a tightly packed tube bundle. There may be many hundreds or even thousands of tubes 16 extending between the tubesheets 12, 14. The vessel 10 includes a top dome (or top head) 13 and a bottom dome (or bottom head) 15, as well as manways 17 for access to the tubesheets 12, 14 inside the vessel 10. In this particular chemical reactor, the tubes 16 are filled with catalyst pellets, which assist with the chemical reaction. It should be noted that similarly-shaped shell and tube vessels may be used for other purposes, such as for a boiler or other heat exchanger. These vessels may have either fixed or removable heads. In this embodiment, the heads 13, 15 are fixed.

In many instances, it is desirable to temporarily plug a tube 16 in the tubesheet 12 and to visually identify the condition of that tube 16. For example, in a partial catalyst handling operation in the prior art, all the tubes 16 may be plugged initially to protect the catalyst in the tubes 16. Each tube 16 is then individually unplugged, and some of the catalyst in the tubes 16 is vacuumed out to the desired outage level. (The outage level is the level inside the tube 16 above which there is no catalyst.) The tube 16 is then replugged, preferably with a different color cap identifying the tube 16 as being in a new, corrected-outage condition. Once all the tubes 16 in the tubesheet 12 have been corrected to the desired outage, (with the exception of those tubes 16 which are not to be disturbed, such as thermocouple tubes or previously permanently plugged tubes), the plugs are removed from all the tubes 16, the tubes 16 are pressure tested, and new color-coded plugs are installed on the tubes 16 to identify them as either passing (meaning that they fall within the desired back pressure), or having failed high, or having failed low (meaning the back pressure was too high or too low, respectively). The procedure may be repeated a number of times as the failed tubes are further corrected until they are brought into a desirable back pressure range or until these failed tubes are determined to be unrecoverable and must be reloaded or more permanently plugged. In other prior art examples, tubes are marked with caps or plugs for every step of the catalyst handling procedure with a different color cap or plug used for each or certain sequential steps in that procedure.

Figure 3:
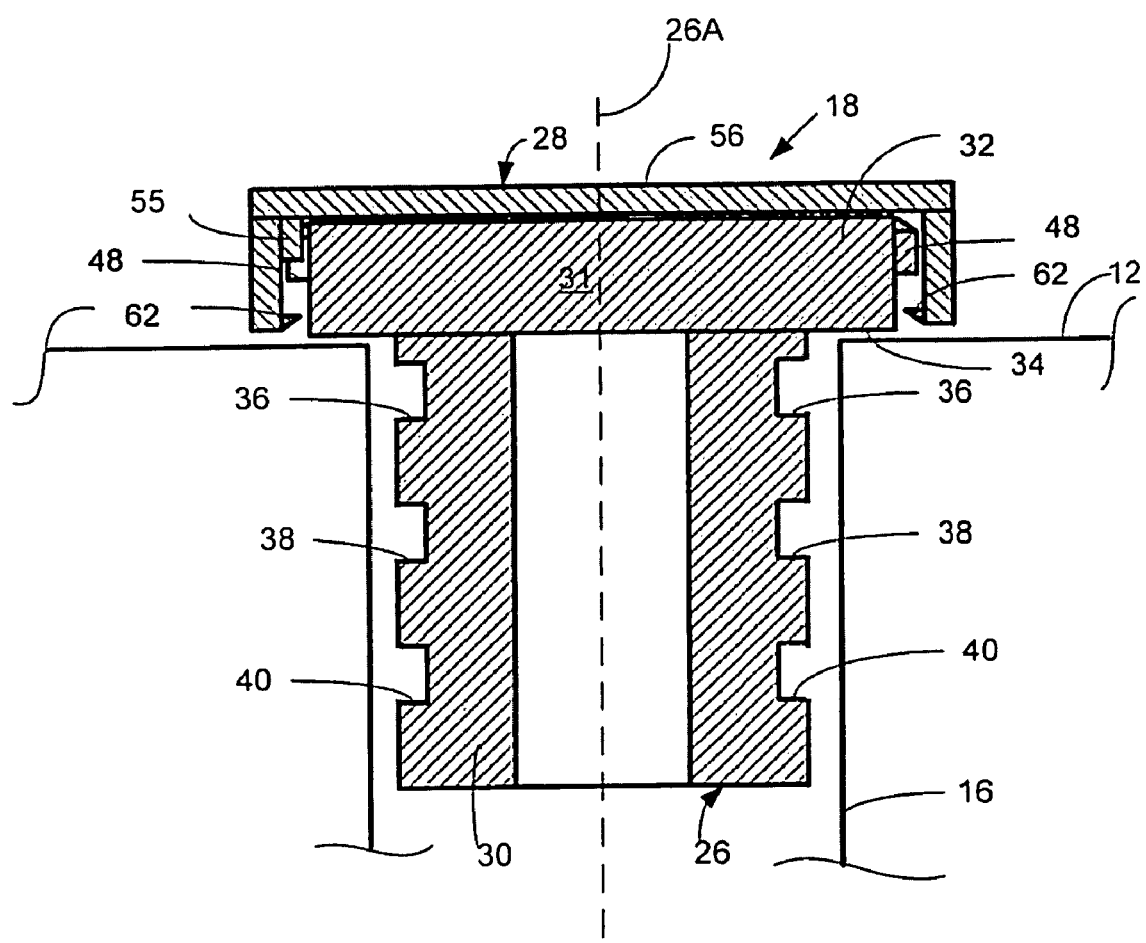
FIG. 3 is an enlarged section view of a tube indicator device installed in its corresponding tube.
Figure 3A:
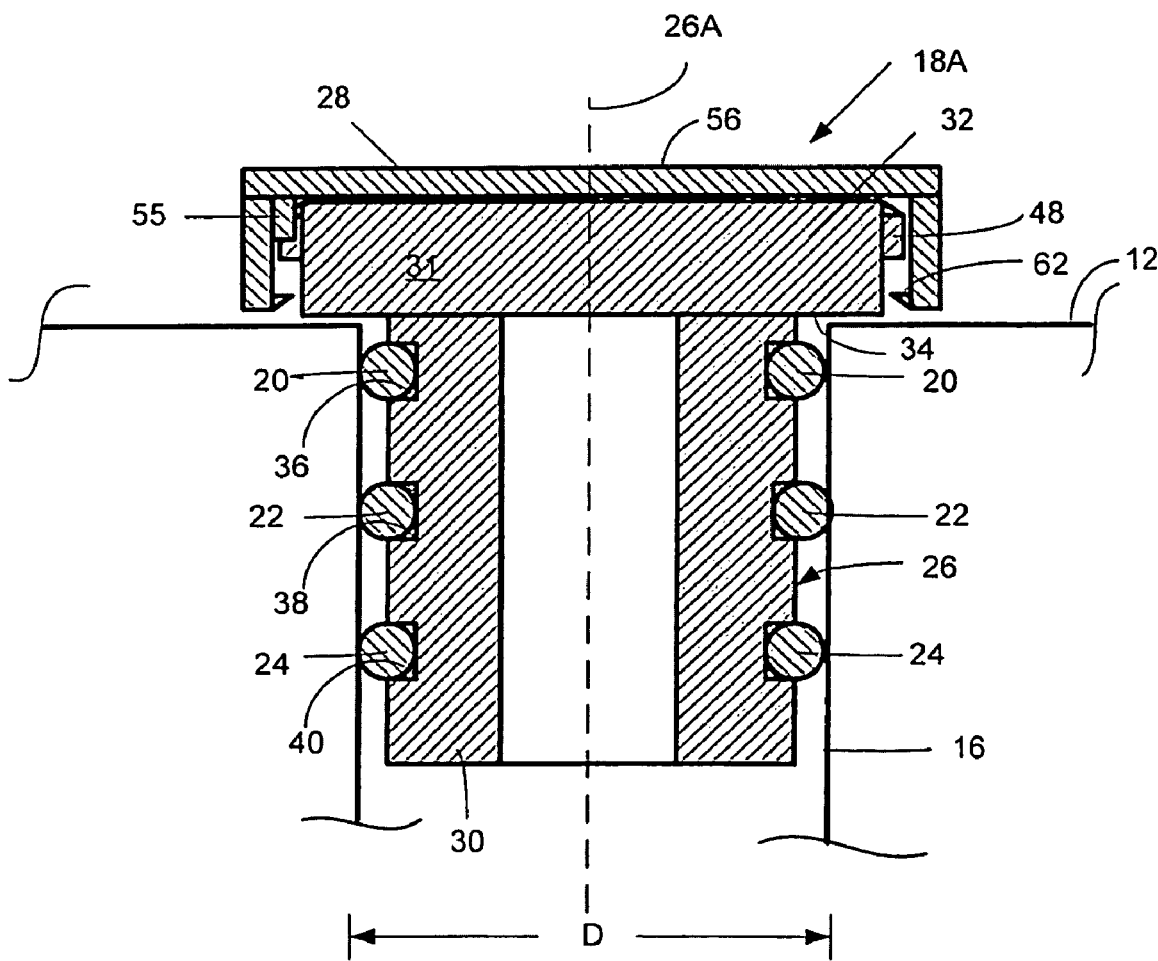
FIG. 3A is a section view, similar to FIG. 3, but with the tube indicator device including O-rings to anchor it to its corresponding tube.

FIGS. 3 and 3A depict tube indicator devices 18, 18A. As will be discussed in more detail below, the tube indicator device 18A of FIG. 3A is identical to the tube indicator device 18 of FIG. 3 except that it includes three O-rings 20, 22, 24 to help anchor it to the tube 16. This may be particularly useful if the indicator device is to be used on the bottom side of a tubesheet.

Figure 4:
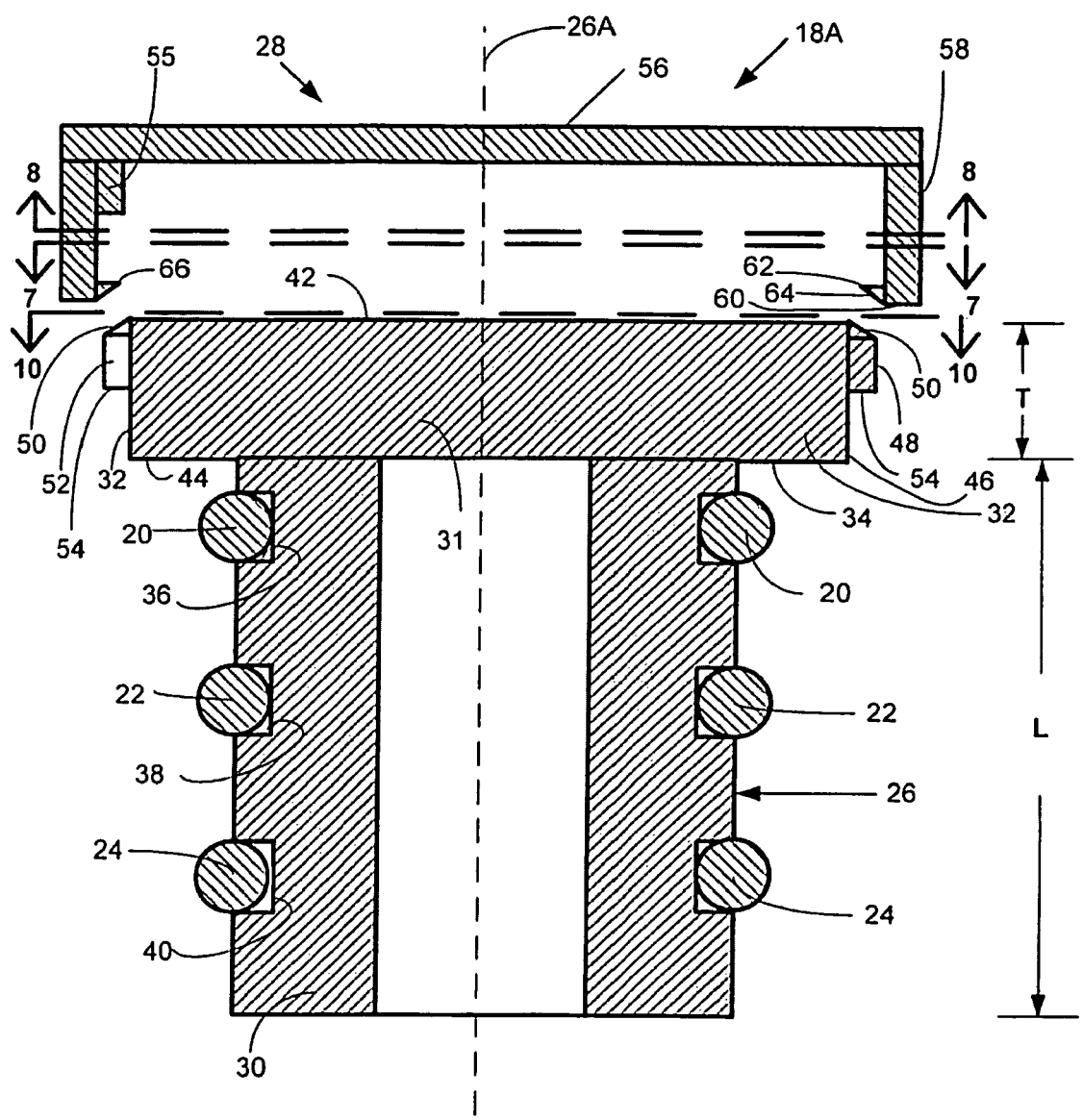
FIG. 4 is a partially exploded section view of the tube indicator device of FIG. 3A.

Referring to FIGS. 3A and 4, the reactor tube 16 has an inside diameter D. The tube indicator device 18A includes a plug 26, a cap 28, and three O-rings 20, 22, 24. The plug 26 includes an elongated, hollow, cylindrical stem portion 30, which has an outside diameter that is smaller than the inside diameter D of the tube 16. In this embodiment; the diameter of the stem portion 26 is between 1/16 inch and 1/8 inch smaller than the tube diameter D.

The stem portion 30 is closed off at one end by a head portion 32, which has an outside diameter that is larger than the inside diameter D of the tube 16. By closing off the end of the stem portion 30, the device 18A functions as a plug, preventing debris from entering the tube 16 when it is inserted into the tube 16 with the head portion resting on the tubesheet. The stem portion 30 defines a length dimension L, which is preferably larger than the outside diameter of the stem portion. Also, the length L of the stem portion 30 preferably is larger than the diameter D (see FIG. 3A) of the tube 16 for which the tube indicator device 18A is designed to be used. More preferably, the length dimension L is at least 1.1 times the tube diameter D.

The stem portion 26 defines a plurality of spaced-apart, circumferential O-ring-receiving grooves 36, 38, 40 for receiving O-rings 20, 22, 24, respectively, as depicted in FIGS. 3A and 4. The O-rings 20, 22, 24 serve to wedge the stem portion 30 against the tube 16. It is understood that the tube indicator device 18A may have any number of O-ring-receiving grooves, including no grooves (or more than the three grooves 36, 38, 40, depicted in FIGS. 3, 3A, and 4), if so desired, and that regardless of the number of grooves present, the tube indicator device 18A may have any number of O-rings 20, 22, 24 inserted in the O-ring-receiving grooves 36, 38, 40 respectively, including having no O-rings, as depicted in the tube indicator device 18 of FIG. 3.

All the O-rings 20, 22, 24 may have the same cross-sectional diameter, or they may have different cross-sectional diameters depending on the intended purpose of the O-rings. For instance, if the purpose of using an O-ring is simply to secure the tube indicator device 18 to a tube 16 so that the tube indicator device 18 will not fall out (as in the case depicted in FIG. 12 where the tube indicator device 18B is inserted along a bottom tubesheet, as is explained in more detail later), a single O-ring may be used to provide a snug fit inside the tube 16. However, if what is desired is to provide a "semi" permanent tube indicator device 18A which cannot be readily removed by the catalyst handling personnel, then all the O-ring-receiving grooves 36, 38, 40 may be loaded with O-rings 20, 22, 24, and these O-rings 20, 22, 24 may be of a larger cross-sectional diameter than that of the single O-ring embodiment 18B depicted in FIG. 12, such that the tube indicator device 18A has a tight fit (instead of just a snug fit) inside its respective tube 16 and can only be removed by exerting a substantial force. It is thus understood that the degree of difficulty for removing the tube indicator device 18A from a tube 16 may be affected by the number of O-rings present in the tube indicator device 18A as well as by the cross-sectional diameter of the O-rings used. This degree of difficulty may be made to range from a simple "drop" fit as shown in FIG. 3, wherein no O-rings are present, to a "very tight" fit, as shown in FIG. 3A, wherein all the O-ring-receiving grooves 36, 38, 40 have O-rings 20, 22, 24, and these O-rings are selected to provide a very tight fit between the plug portion 26 and the tube 16. It should be obvious to those skilled in the art that various materials can be used to make up the O-ring, ranging from rubber to felt to expanded plastic, among others.

The degree of difficulty in removing the tube indicator device 18A may be fine-tuned not only by changing the number of O-rings used, but also by changing the cross-sectional diameter of particular O-rings within a tube indicator device 18A. For instance, a tube indicator device 18A may have its topmost O-ring 20 (the O-ring closest to the head portion 32) be of a larger cross-sectional diameter than the other two O-rings 22, 24. This tube indicator device 18A would then require slightly less effort to remove it from its tube 16 than if all its O-rings 20, 22, were of the same, larger cross-sectional diameter as that of O-ring 20. Furthermore, this tube indicator device 18A would be easier to remove from its tube 16 than an identically equipped tube indicator device 18A in which it was the bottom-most O-ring 24 which had the larger cross-sectional diameter than the other two O-rings 20, 22, since this larger cross-sectional diameter O-ring 24 would have to be dragged over a longer distance of tube 16 before the tube indicator device 18A could pop free from the tube 16.

Figure 12:
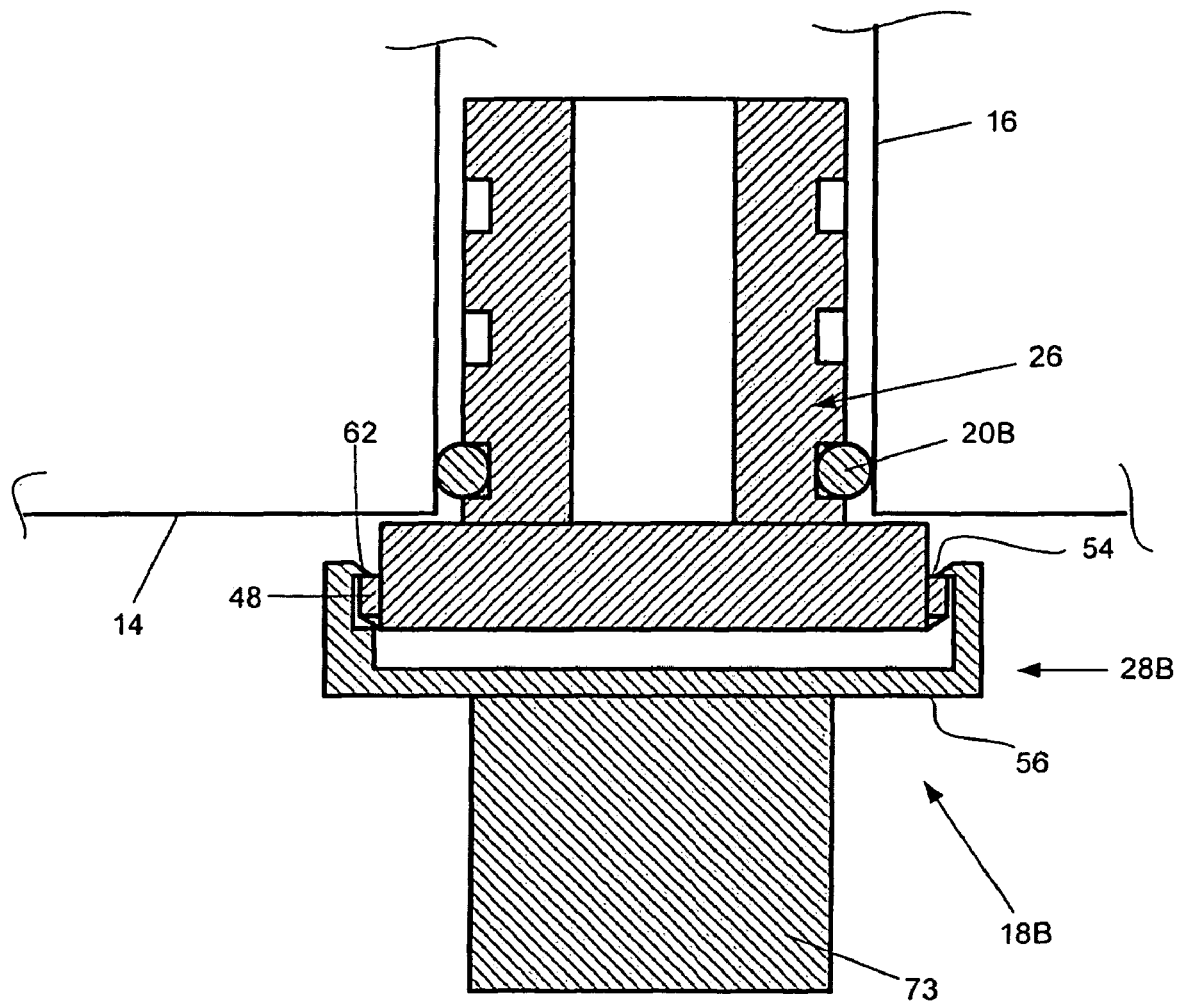
FIG. 12 is a section view of another embodiment of a tube indicator device being used along a bottom tubesheet.
Figure 21:
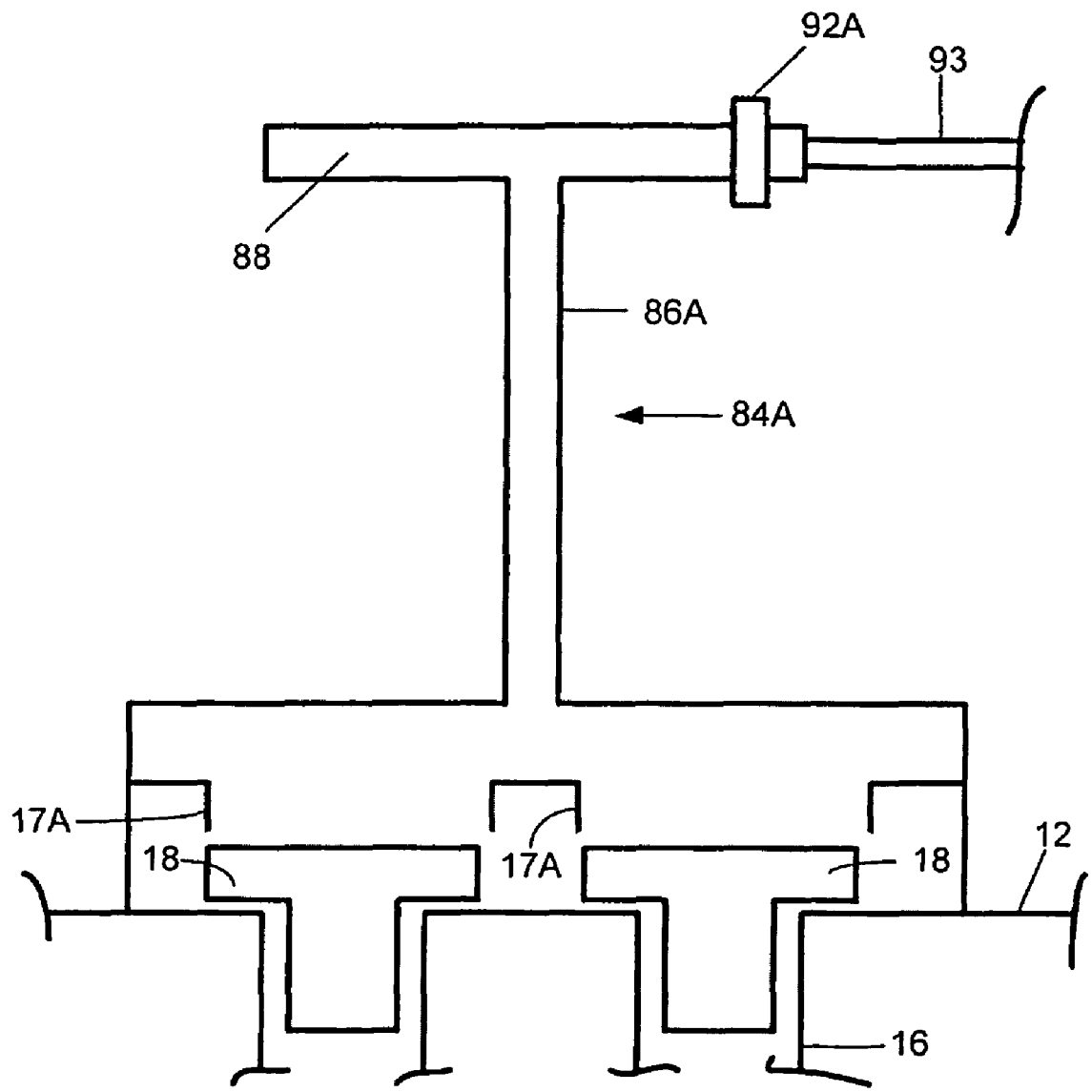
FIG. 21 is a schematic section view of a plug removal device that uses a vacuum to remove the plugs.

This feature may allow the user to employ mechanical means to selectively remove certain tube indicator devices while leaving others behind in the tubesheet 12. For instance, a tube indicator device 18 with no O-rings (as shown in FIG. 3) may be readily removed by use of a suction line from a vacuum-activated cap removal device, as shown in FIG. 21, while leaving all other tube indicator devices (which have one or more O-rings) in place. A deeper suction in the suction line may be used to remove the next set of tube indicator devices, which may have a single O-ring (as shown in FIG. 12), while leaving all other tube indicator devices in place. Progressively increasing suction may be used to remove progressively tighter tube indicator devices. Other mechanical means, such as the use of progressively stronger magnets may alternatively be used to selectively remove appropriately equipped tube indicator devices from the tube sheet 12 (as described in more detail below).

Referring back to FIGS. 3A and 4, the head portion 32 of the plug 26 includes a substantially flat, cylindrical disk 31, having a larger outside diameter than the inside diameter D of the tube 16. The disk 31 is concentrically aligned with the plug 26, having the same longitudinal axis 26A. The disk 31 extends radially beyond the stem portion 26 to form an axial shoulder 34 (See FIG. 4) which rests on the tubesheet 12 as seen in FIG. 3A. As shown in FIG. 4, the disk 31 has a height or thickness T, a top surface 42, a bottom surface 44 and a circumferential edge 46. A circumferential ring 48 (See also FIG. 10) extends radially beyond the edge 46 of the disk 31 and extends downwardly from the top surface 42 of the disk 31 to approximately halfway down the thickness T of the disk 32, with the upper portion of the ring 48 defining a downwardly-ramped surface 50, and the lower portion of the ring 48 defining a flat axial shoulder 54.

Figure 10:
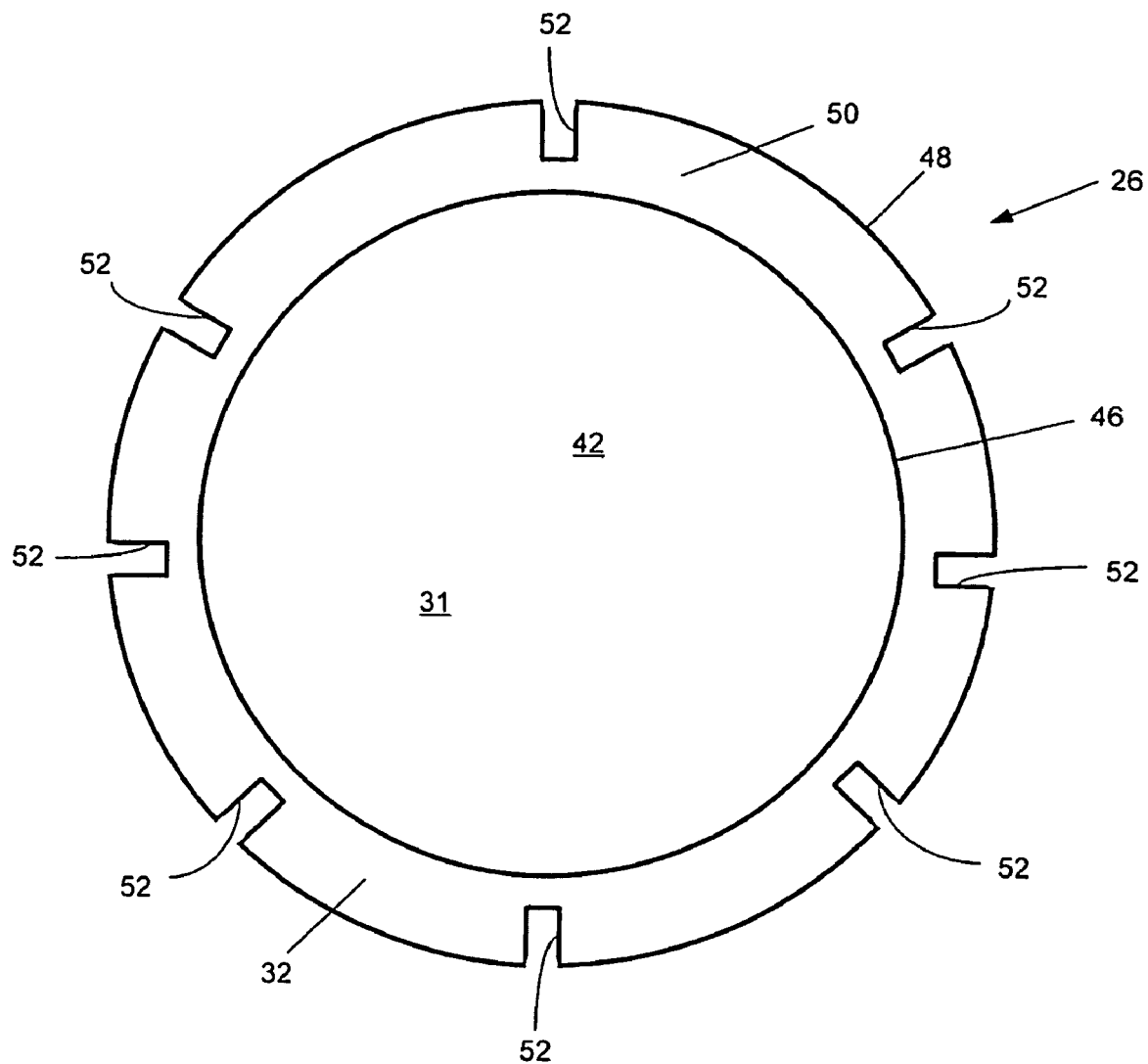
FIG. 10 is a view along line 10-10 of FIG. 4, prior to the installation of a color sticker on the head of the plug.

As shown in FIG. 10, the ring 48 has a plurality of vertically-oriented notches 52 along its periphery. These notches 52 are located at approximately every 45 degrees. Each notch 52 is sized to receive a tab projection 55 from the cap portion 28, as described in more detail below.

The plug 26 is preferably a molded, one piece part, made from a thermoplastic such as ABS (acrylonitrile butadiene styrene), though it could be made from other materials such as other plastics, cast aluminum, or ferro-magnetic, machined steel.

Figure 11:
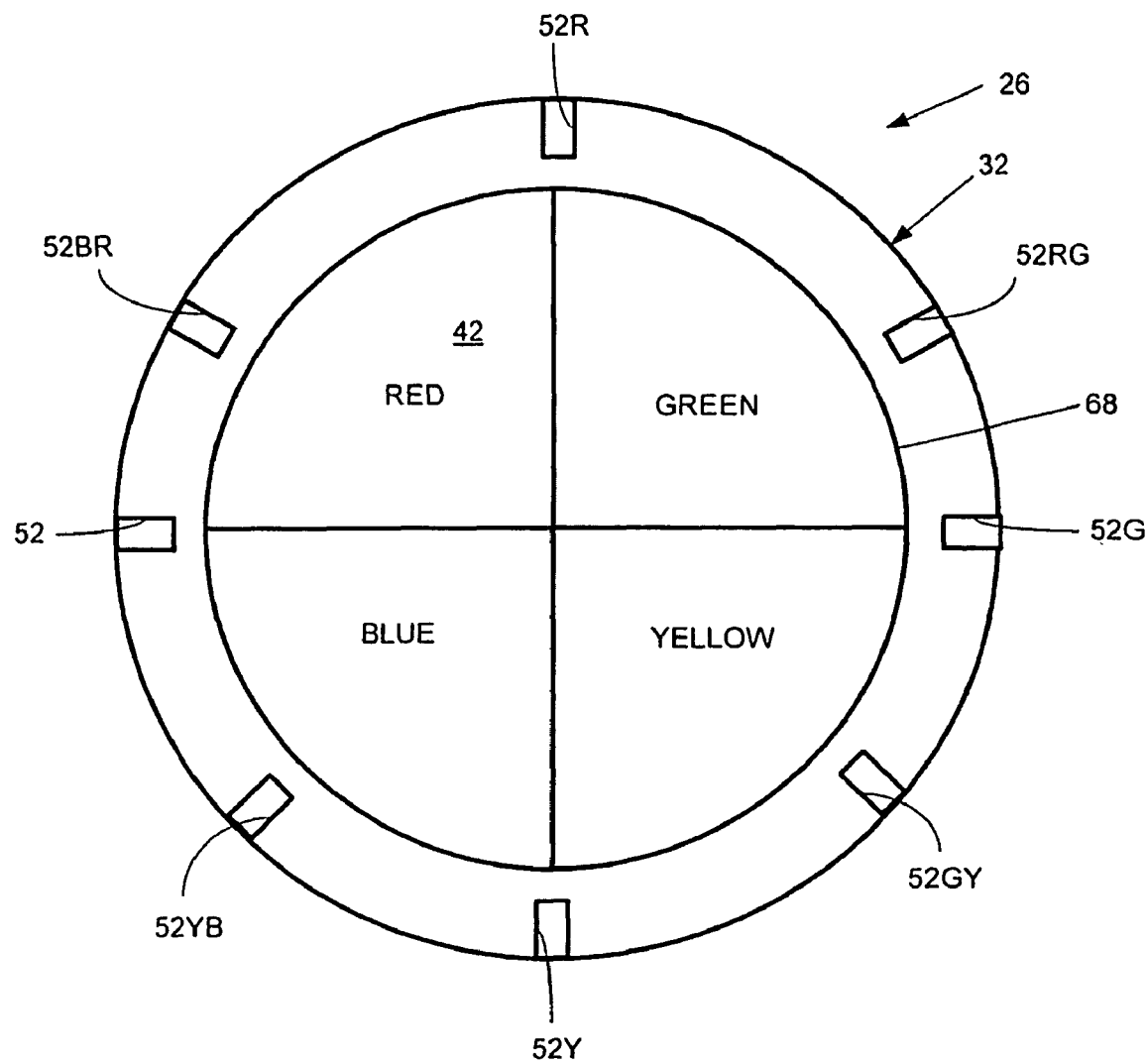
FIG. 11 is the same view as FIG. 10 but after the installation of a color sticker on the head of the plug.

Referring briefly to FIG. 11, the top surface 42 of the plug 26 may have portions in different colors. In this particular embodiment, a circular peel-off sticker 68 has been adhered to the top surface 42. The sticker 68 is divided into quadrants, which are colored red, green, yellow, and blue, with the axes of the quadrants substantially aligned with four of the notches 52 (which in FIG. 11 are labeled 52, 52R, 52G, and 52Y) in the head portion 32 of the plug 26.

Figure 5:
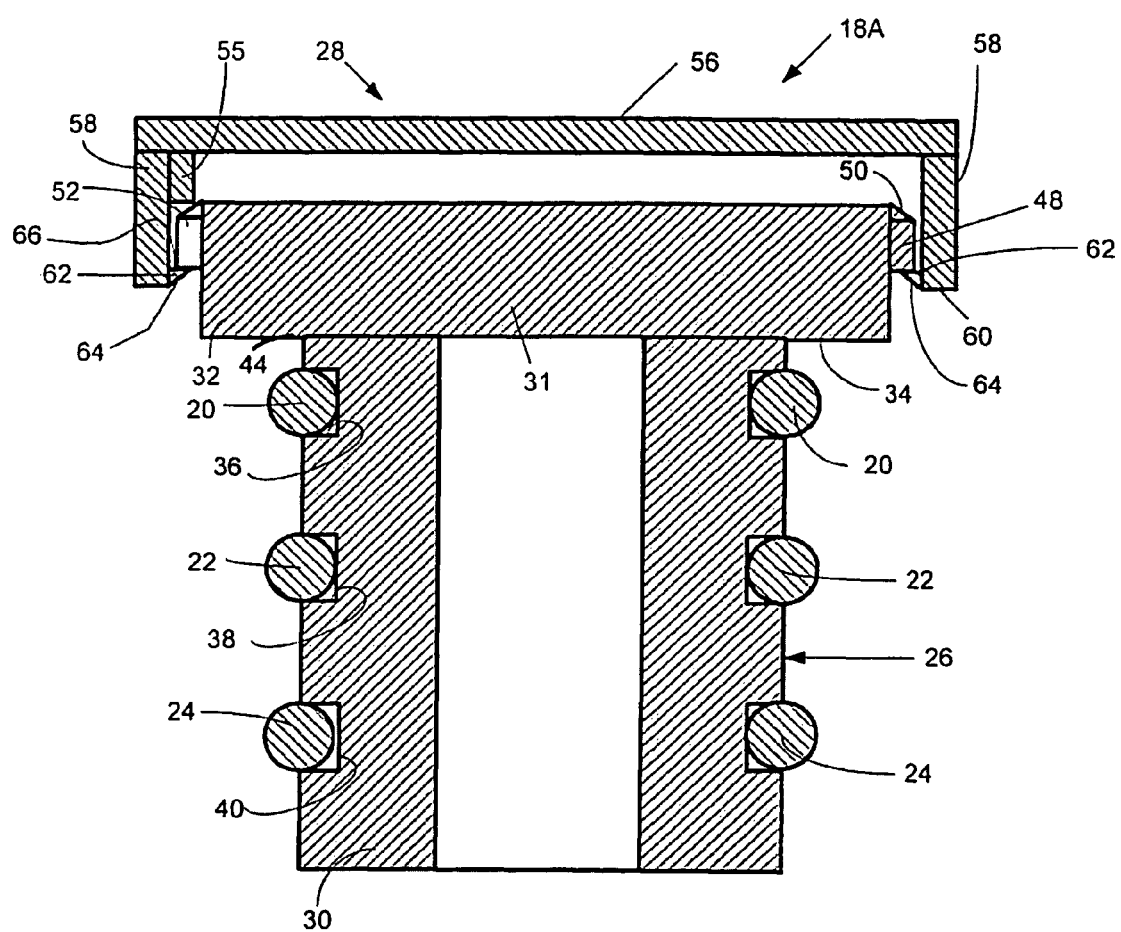
FIG. 5 is a section view of the tube indicator device of FIG. 4 in an assembled condition with the cap in its raised position.
Figure 7:
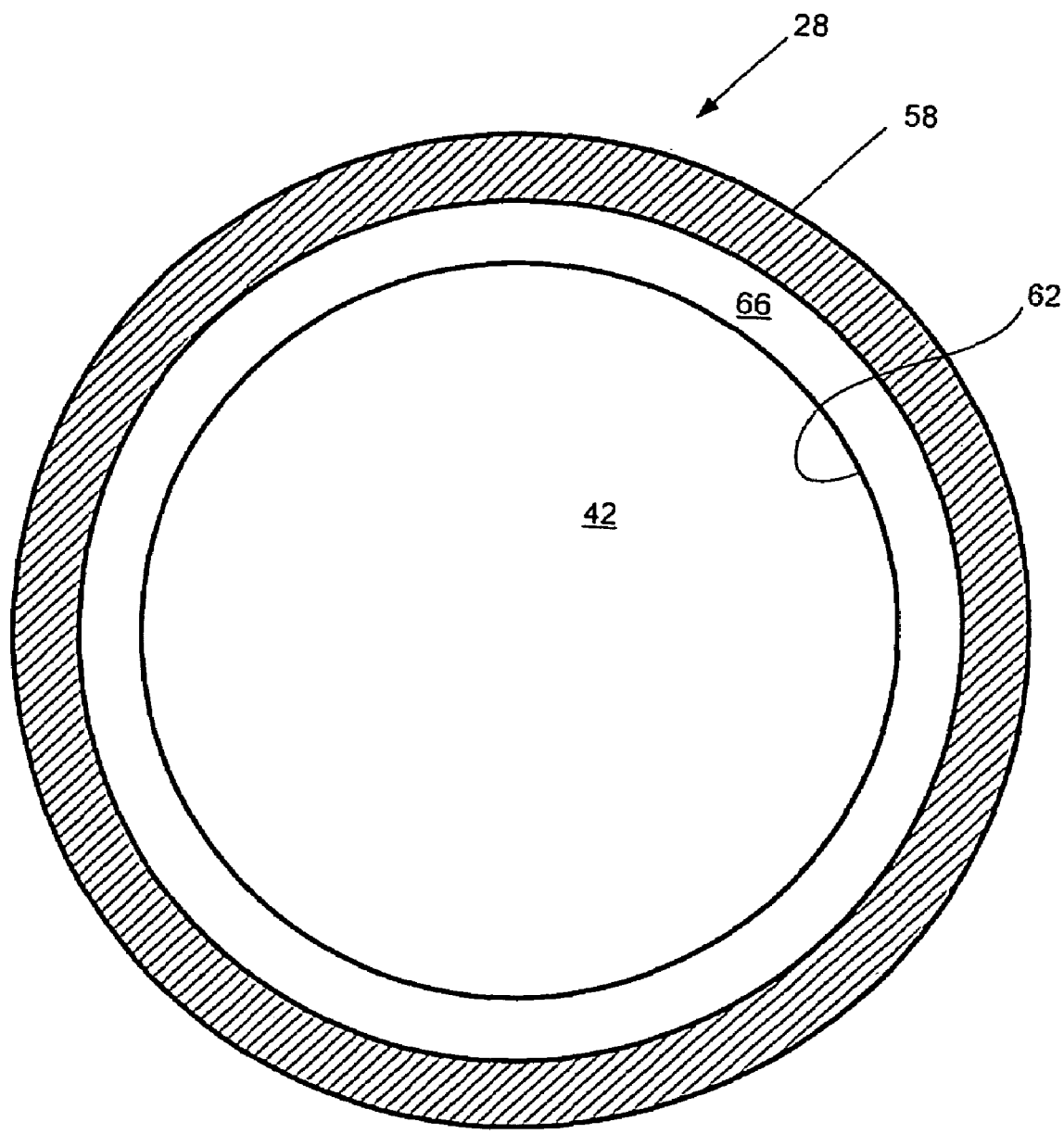
FIG. 7 is a view along line 7-7 of FIG. 4.
Figure 8:
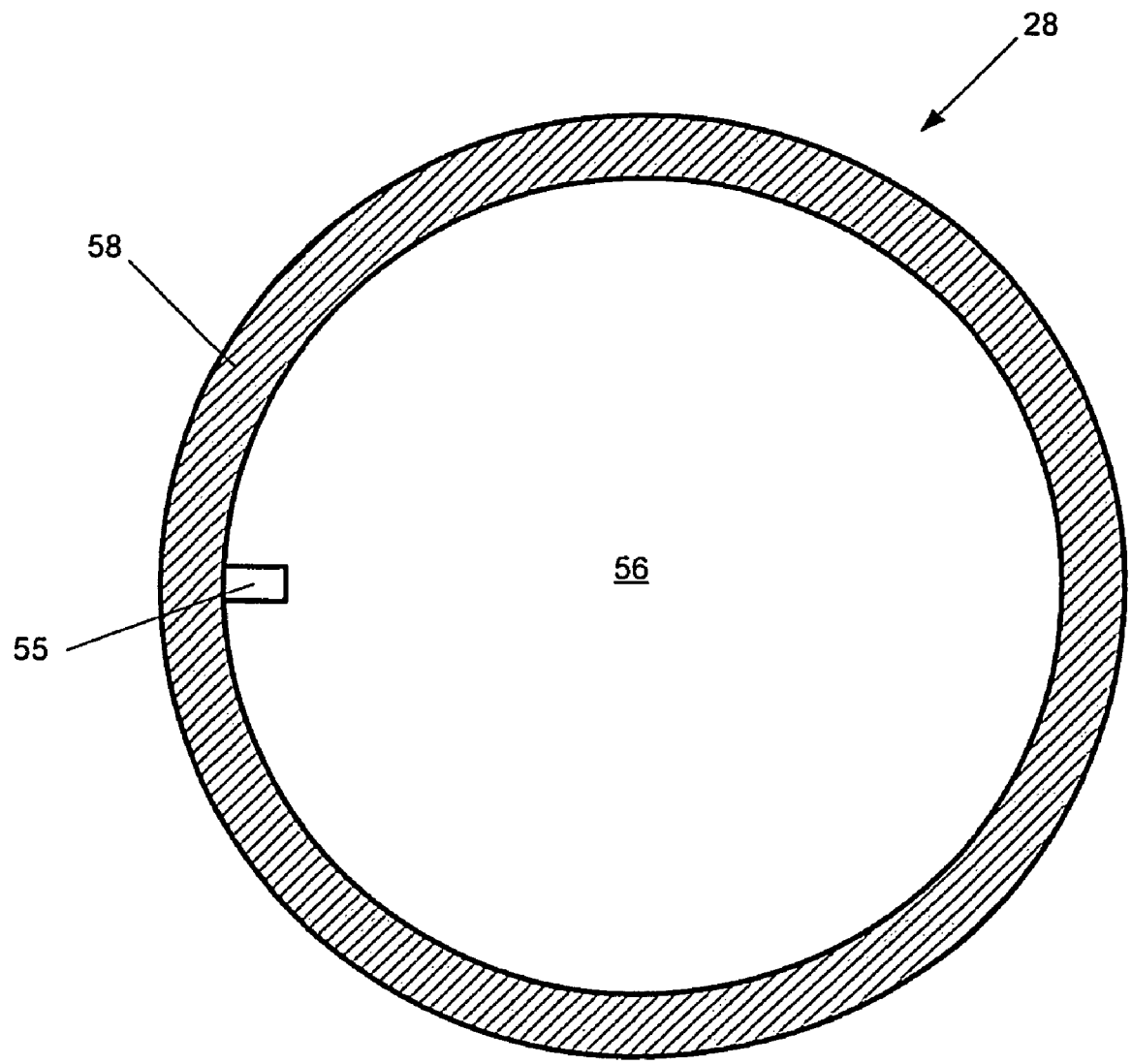
FIG. 8 is a view along line 8-8 of FIG. 4.

Referring now to FIGS. 5, 7, and 8, the cap 28 is a hollow cylindrical body including a top 56 and an annular side 58 projecting perpendicularly downwardly from the top 56. The annular side 58 has a bottom-most surface 60. An inwardly-directed annular projection 62 (See also FIG. 7) extends from the lower portion of the annular side 58, with the bottom surface 64 of this inwardly-directed annular projection 62 defining an upward-tapered ramp, and the top 66 (See also FIG. 5A) of this inwardly-directed annular projection 62 defining a horizontal shoulder.

When the cap 28 is lowered over the head 32 of the plug 26 (as shown in FIG. 5), the upward ramp 64 of the cap 28 cooperates with the downward ramp 50 of the head 32, causing the annular side 58 of the cap 28 to stretch out momentarily to allow the inwardly-directed projection 62 on the cap 28 to clear the outwardly-directed ring 48 on the plug 26, until the side 58 of the cap 28 snaps into place over the outwardly-directed ring 48 on the head 32 of the plug 26. The shoulder 66 of the inwardly-directed projection 62 on the cap 28 then lies directly below the shoulder 54 of the outwardly-directed ring 48 on the head 32 of the plug 26. If someone attempts to pull the cap 28 off of the plug 26, the shoulder 66 of the inwardly-directed projection 62 will contact the shoulder 54 on the ring 48 on the head 32 of the plug 26 to prevent the cap 28 from pulling off of the plug 26. It should be noted that, while the inwardly-directed projection 62 is shown in FIG. 7 as a continuous ring, it may instead be discontinuous, being made up of a plurality of spaced-apart arcuate portions which serve the same purpose while making it easier to snap the cap 28 over the head 32 of the plug 26.

Figure 6:
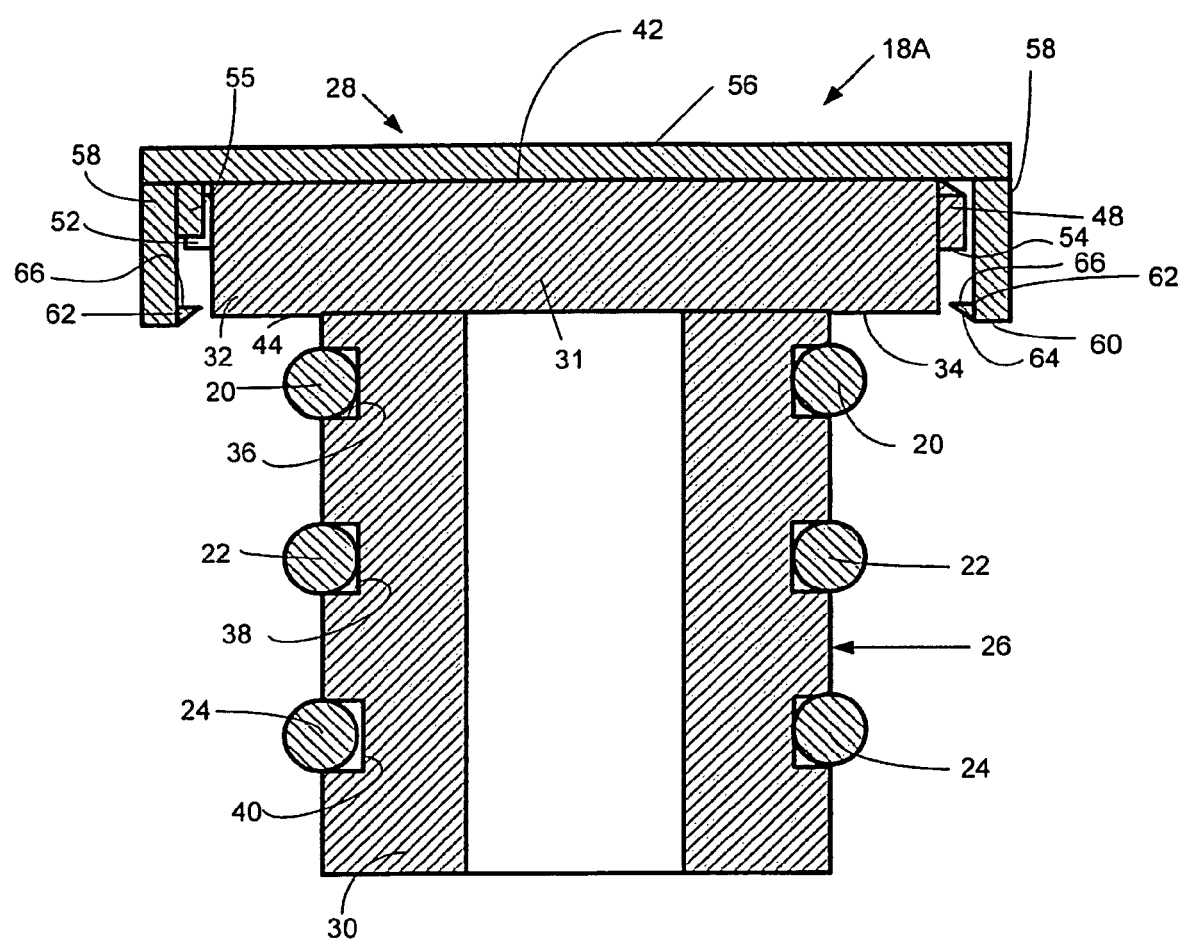
FIG. 6 is a section view of the tube indicator device of FIG. 4 with the cap in its lowered position.

The inside of the cap 28 further defines an inwardly-directed tab 55 (See also FIG. 8) which projects radially inwardly from the annular side 58 and is located in the upper portion of the interior of the cap 28, abutting the underside of the top 56 of the cap 28. As described earlier, this tab 55 is sized to be received in the notches 52 (See FIG. 10) in the top surface of the head 32 of the plug 26 when the top 56 of the cap 28 is resting on the top surface 42 of the head 32 of the plug 26 as seen in FIG. 6.

The cap 28 preferably is molded from a transparent or translucent thermoplastic such as a polycarbonate, or it could be made from other materials, such as a magnetically-attractive ferromagnetic material. If made from a transparent or translucent material, three of the four quadrants should be "blacked out" or otherwise obscured by scuffing or adding a visibility barrier, as shown in crosshatching in FIG. 9. This blacking out may be accomplished by sticking a peel off sticker 70 on the cap 28, preferably on the inside surface of the cap 28 so that the sticker 70 is protected. This leaves a transparent or translucent window quadrant 72. The window quadrant 72 can be recessed slightly from the top surface of the cap 28 if desired (not shown) such that its surface is protected from accidental scuffing by foot traffic, thus helping to keep it transparent or translucent. In this particular embodiment, the window quadrant 72 is flush with the rest of the top surface of the cap 28.

Figure 9:
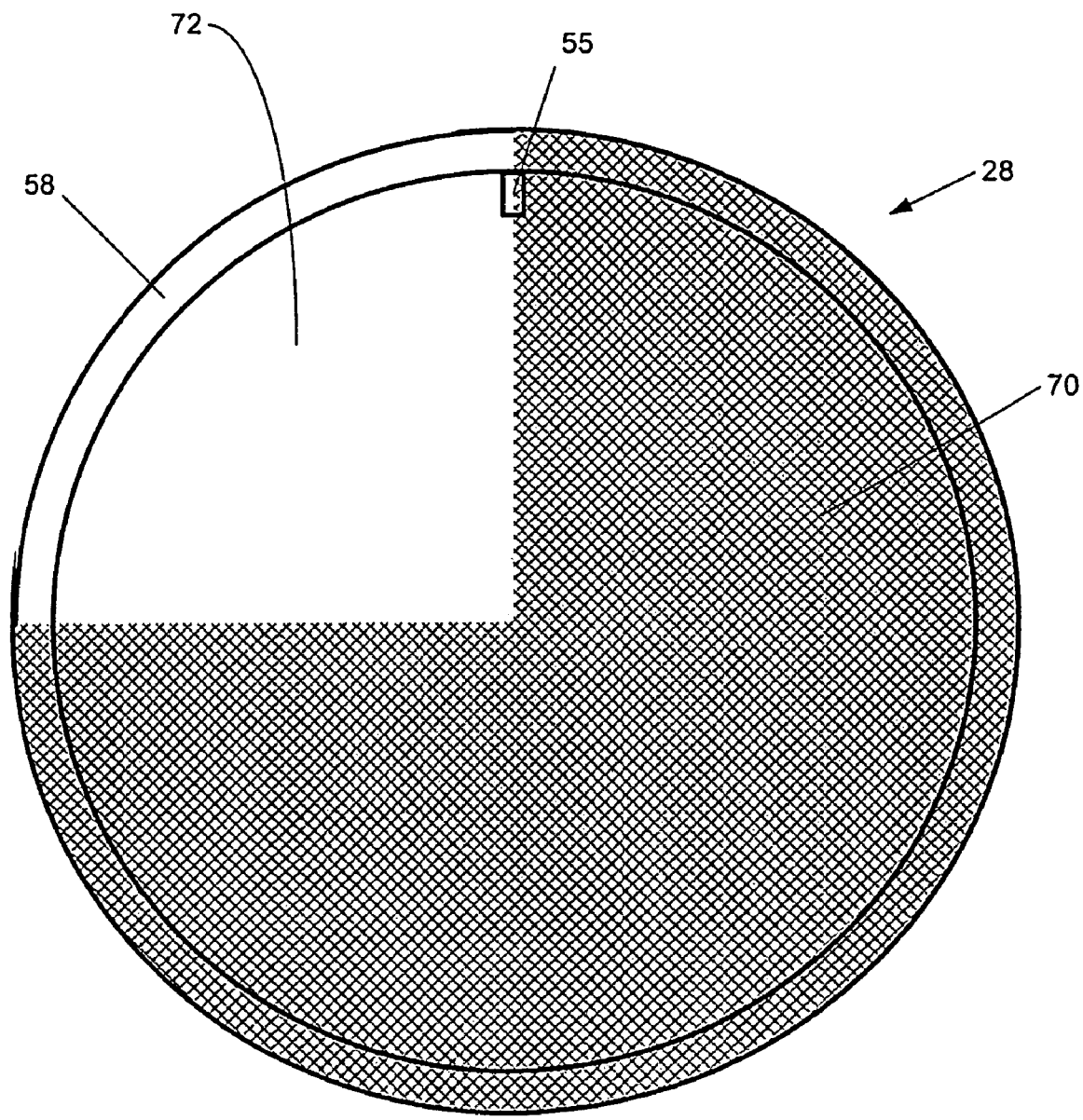
FIG. 9 is a plan view of the cap of FIG. 4.

If the cap 28 is made from a metal, the blacked out area 70 could simply be part of the solid metal cap. In that case, the window area 72 could be a through opening, with no material to block the view of the colored plug 26 (or it could be a transparent or translucent window which snaps in, or otherwise secures, to the window area 72 to provide a covering to prevent any dust or other foreign matter from entering the area between the plug 26 and the cap 28). The window 72 is located such that one of its quadrant axes is substantially aligned with the tab 55 of the cap 28, as shown in FIG. 9.

Figure 5A:
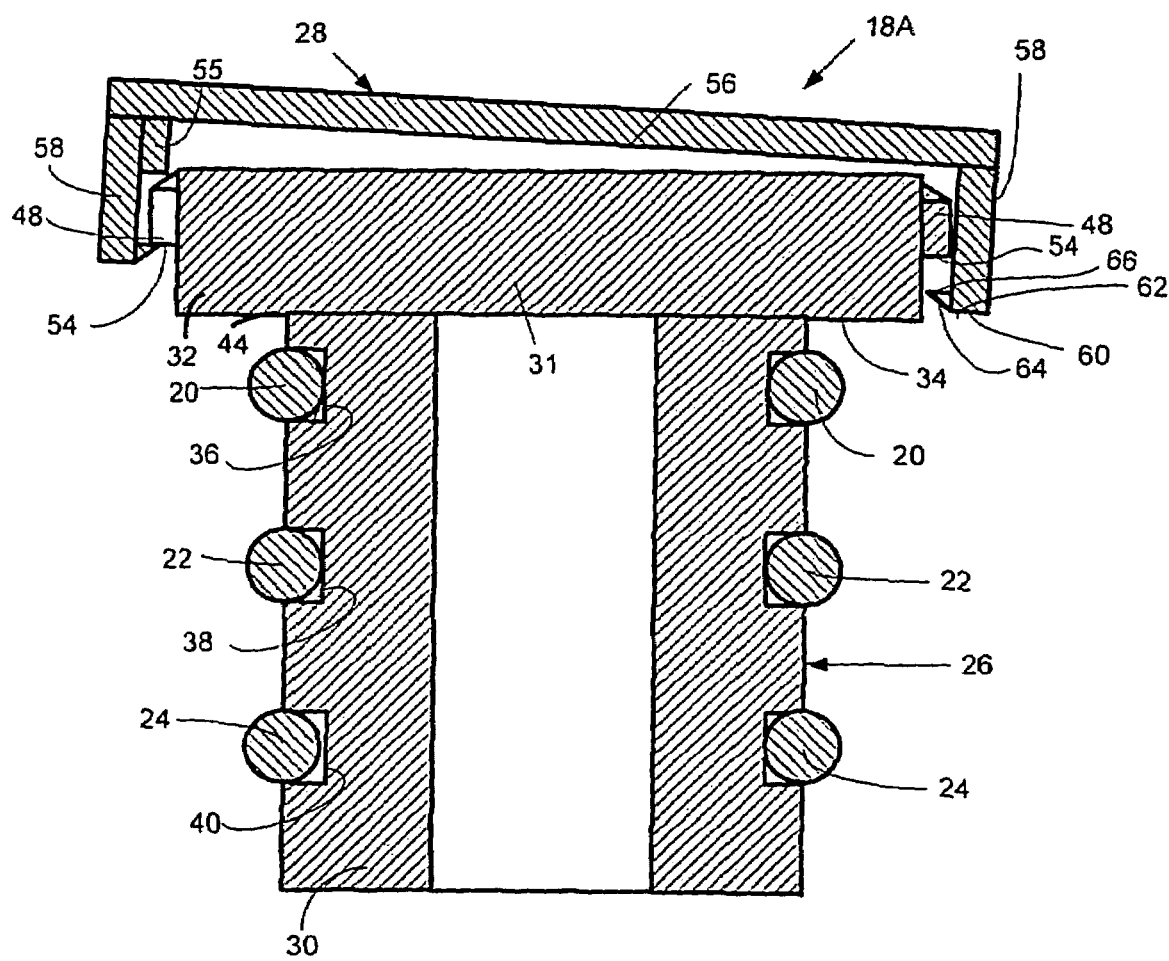
FIG. 5A is a section view of the tube indicator device of FIG. 4 in an assembled condition with the cap in its raised but angled position.

To reposition the window 72 over a desired stationary quadrant of the peel-off sticker 68 on the plug 26, the user raises the cap 28 relative to the plug 26, to the position shown in FIG. 5. In this position, the inwardly-directed projection 62 on the cap 28 abuts the shoulder 54 of the outwardly-directed ring 48 on the plug 26, so the cap 28 will not become completely separated from the plug 26. Also, in this position, the tab 55 is lifted out of the notch 52 in which it is normally received and clears the top of the outwardly-directed ring 48, such that the cap 28 is no longer locked against rotation relative to the plug 26. The user then rotates the cap 28 slightly to bring the tab 55 out of alignment with the notch 52 and then releases the cap 28 to the position shown in FIG. 5A. As shown in FIG. 5A, the cap 28 now lies at an angle to the plug 26, with the tab 55 on the inside of the cap 28 resting on top of the ramped top surface 50 of the outwardly-directed ring 48 on the plug 26.

The user then rotates the cap 28 approximately 45 degrees, until the tab 55 lines up with the next notch 55 in the plug 26, and then releases the cap 28, which falls back to the fully lowered position depicted in FIG. 6, wherein the cap 28 is fully resting on the top surface 42 of the plug 26 and the tab 55 locks the cap 28 against further rotation relative to the plug 26.

Looking now at FIG. 11, if the tab 55 is received in the notch 52 of FIG. 11, the window 72 will be completely aligned with the blue quadrant of the plug 26. An observer will see only the color blue through the window 72, with the other three quadrants being "blacked out" by the blackout sticker 70 (See FIG. 9) of the cap 28. This will indicate that the tube 16 is in the "blue" condition. If the user rotates the cap 28 until the tab 55 is aligned with (and rests within) the notch 52BR in FIG. 11, the window 72 will then be straddling both the blue and the red quadrants, which indicates a second type of tube condition. Rotating the cap 28 until the tab 55 is aligned with the notch 52R brings the window 72 into alignment with the red quadrant. If the user rotates the cap 28 further until the tab 55 goes into the notch 52RG, then the window 72 will straddle the red and green quadrants. Rotating the cap 28 further, in order to align the tab 55 with the notch 52G brings the window 72 into alignment with the green quadrant. When the tab 55 is in the notch 52GY, the window 72 straddles the green and yellow quadrants. When the tab 55 is in the notch 52Y, the window 72 is aligned with the yellow quadrant, and when the tab 55 is in the notch 52YB, the window 72 straddles the yellow and blue quadrants.

In this manner, the device 18A serves as an indicator to provide a visual indication of the condition of a tube 16. The position of the cap 28 relative to the peel-off sticker 68 (and therefore also relative to the head of the plug 26) makes a color quadrant (or a combination of color quadrants) visible through the window 72 in the cap 28, which corresponds to a first tube condition. Changing the relative position of the cap 28 relative to the plug 26 displays a new color quadrant (or a combination of color quadrants) visible through the window 72 corresponding to a second condition of the tube 16. The color or color combination visible through the window serves as the indicator of the condition of the tube 16. While the tube indicator device 18A may be removed from the tube 16 in order to change the indicator to display a different condition of the tube 16, this change of the indicator may be carried out while the tube indicator device is still in the tube.

It should be noted that in this embodiment 18A, the tube indicator device plugs (closes off) the tube 16 when it is inserted into the tube, because the head portion 32 covers the opening of the tube 16. Thus, it serves both as an indicator device and as a plugging device.

To assemble the tube indicator device 18A of FIGS. 3A through 6, first a determination is made as to the function expected of the tube indicator device 18A. The following are some of the possible scenarios:

1—The tube indicator device will be used as a "semi" permanent plug (to mark tubes such as those having a thermocouple or a pressure sensor in them or those tubes which have been temporarily plugged with inert material in a prior catalyst handling operation) which the catalyst handling crew should leave untouched. In this instance, it would not be necessary to install a cap 28 on the plug 26. The plug 26 could be used alone, preferably with a full complement of O-rings 20, 22, 24 to make it difficult to remove.

This version of the tube indicator device will be readily distinguishable from other versions by the fact that it does not have a cap 28, and it will have a very tight fit in its corresponding tube 16, such that a catalyst changeover worker would have to struggle to pull the plug 26 out. Preferably, a colored sticker 68 would not be placed on the top surface 42 of the plug, and the plug may have a distinctive color, such as "battleship gray", which makes it readily identifiable as a "semi" permanent plug.

Note that a special tool may be used to remove these "semi" permanent plugs from their respective tubes, and the plant may decide not to make this special tool available to the catalyst changeover crew in order to help ensure that these plugs remain in place throughout the changeover operation. The tool (not shown) could be a simple two-pronged hook with a handle. The two prongs would hook under the shoulder 54 of the ring 48 of the plug 26, with the head 32 of the plug 26 between the two prongs, and a strong upward tug of the handle would pull the "semi" permanent plug upwardly, out of its tube. (Note that the plug 26 may be installed in its tube by pushing down on it forcefully or by stepping on the head 31 of the plug 26, or by tapping the head 31 of the plug 26 with a rubber mallet, for instance).

2—The tube indicator device will be used to cover the top of its respective tube and identify the condition of that tube 16. In this instance, the tube indicator device 18 of FIG. 3 (without O-rings) is likely to be selected. For this embodiment, a colored, peel off sticker 68 (See FIG. 11) is secured to the top surface 42 of the plug 26, and a cap 28 is snapped over the head 32 of the plug 26, as discussed earlier. Then the user aligns the window 72 of the cap 28 with the desired colored portion of the plug 26 based on some pre-determined convention to provide information to the people involved in the catalyst changeover as to the condition of the tube into which the device has been inserted.

One way these devices 18, 18A could be used is as follows:

A) All tubes 16 are initially uncapped except those that have already been "semi" permanently plugged as described in scenario number 1 above.

B) The uncapped tubes 16 are all pressure drop tested and sorted into three categories:
  tubes 16 that pass (exhibit a pressure drop within the desired range) receive a tube indicator device 18 in which the window 72 has been aligned with the green quadrant to indicate a "pass" condition.
  tubes 16 that fail high (too high a pressure drop) receive a tube indicator device 18 in which the window 72 has been aligned with the red quadrant.
  tubes 16 that fail low (too low a pressure drop) receive a tube indicator device 18 in which the window 72 has been aligned with the yellow quadrant.

C) Then, all red capped and yellow capped tubes are "corrected" according to an agreed upon corrective strategy (which may require, for instance, the removal of a certain amount of catalyst from tubes which have failed high and the addition of a certain amount of catalyst to tubes which have failed low, or other corrective strategies which may include removal and replacement of some or all of the catalyst in the failed tube depending on outage reading and/or pressure drop reading. Usually, the corrective action requires removal of the tube indicator device, but that may not always be the case.

Once a red-capped tube has been corrected, it is recapped with a tube indicator device 18 in which the indicator window 72 is aligned so as to straddle both the red and the green quadrants. That is, the pie-shaped indicator window 72 will show an eighth of a "pie" in red and another eighth of a "pie" in green. This corresponds to the tab 55 being received in the slot 52RG in FIG. 11. This may be accomplished by taking the same tube indicator device 18 that had been in that tube and then rotating the cap relative to the plug until the window 72 straddles the red and green colors, as described above.

Using this color coding arrangement, if a worker sees an indicator in which the colors red and green are visible through the window 72, he knows that this represents a tube which failed high (the red portion of the sticker) but which has been corrected in an attempt to bring it back into range (the green portion of the sticker).

Similarly, a yellow capped tube, once corrected, would be recapped with a tube indicator device 18 in which the indicator window 72 is aligned so as to straddle both the yellow and the green quadrants. This corresponds to the tab 55 being received in the slot 52GY (See FIG. 11) and could be achieved by simply rotating the cap on the tube indicator device 18 that was in that tube prior to the correction. The yellow/green showing through the window 72 now represents a tube which failed low (yellow) and which has been corrected in an attempt to bring it back into range (as indicated by the green portion). In this manner, the same tube indicator device 18 may continue to be used in the same tube 16 to indicate the various conditions of the tube 16 as those conditions change simply by rotating the cap (changing the indicator) to a new position so the indicator displays a different color or a different combination of colors.

D) Then, all the red/green and yellow/green tubes are retested to see whether they now meet the desired specifications. They would again be sorted into three categories:
  tubes that pass this time around receive a tube indicator device 18 with the indicator window 72 showing only green.
  tubes that once again fail high (too high a pressure drop) receive a tube indicator device 18 with the indicator window 72 showing only red.
  tubes that once again fail low (too low a pressure drop) receive a tube indicator device 18 with the indicator window 72 showing only yellow.

E) The procedure may be repeated as many times as required and the various colors and combination of colors can be used to indicate all manner of testing, usage, corrections and any other designation needed. Ultimately, any tubes which fail to pass regardless of the correction strategy employed may be marked with a tube indicator device 18 with the indicator window 72 showing only blue. This is an indication that the tube may be unrecoverable and should be exposed to more rigorous corrective strategies or even more "permanently" plugged, such as by welding a metal plug into the top of the tube 16.

F) A variation on the above procedure could have tubes which fail a second time plugged with a tube indicator device 18 with the indicator window 72 showing both red and blue (if it failed high after correction) or showing both yellow and blue (if it failed low after correction) to indicate the fact that there was an attempt to correct this tube and it has failed again after the correction step.

If this variation (F above) is not used, then the red/blue and the yellow/blue color code combinations are free to be used for any other tube condition designation desired. For instance, a red/blue combination could be used to represent a tube which has failed on a very high pressure drop reading, not likely to be recovered by the agreed upon correction strategy. A yellow/blue combination could be used to represent a tube which has failed on a very low pressure drop reading, indicating an "open" tube, not likely to be recovered by the agreed upon correction strategy and which will require a complete reloading of the tube.

Obviously, while a certain color coding arrangement has been described here, it would be possible to use different colors, to give the various colors different meanings, and so forth.

3—The tube indicator device will be used to cover and identify the condition of its respective tube 16 along the bottom tubesheet 14. In this instance, the tube indicator device 18B of FIG. 12 is likely the embodiment to be used in a position that is upside down from the position shown in FIG. 3A. This embodiment 18B has a single O-ring 20B and a cap 28B with a flag 73 projection on the cap 28B instead of the cap 28 with a window 72 as described in the previous embodiments. The flag 73 may be used as a visual indicator, to help indicate when a capping device is present, and it may be used as a handle for pulling out the capping device. It would also be possible to provide color indications or symbol markings on the flag 73, if desired, to indicate various conditions of the tube into which the device 18B is inserted.

The cap 28B is essentially identical to the cap 28 described above, except for the flag 73 which extends upwardly from the top surface 56 of the cap 28 (or downwardly if the cap is turned upside down as shown in FIG. 12). If the tube indicator device 18B is used upside down and used along the bottom tubesheet 14, as shown in FIG. 12, the "normal" or "at rest" position of the tube indicator device 18B has the cap 28B hanging from the shoulder 54 of the outwardly projecting ring 54 of the plug 26 (instead of resting on top of the top surface 42 of the plug 26). The O-ring 20B (or plurality of O-rings, if desired) has a tight enough fit with the inner surface of the tube 16 to hold the tube indicator device 18B in place.

One way in which the tube indicator device 18B may be used along the bottom tubesheet 14 is that the devices 18B may be inserted into the bottom of all the tubes 16 after the catalyst has been unloaded, from the tubes 16. Then, foam pigs or other cleaning devices may be pushed through the tubes 16 to clean them out before reloading. When the pig or other cleaning device reaches the bottom of its respective tube 16, after being propelled by air or by a mechanical pusher, it will push the tube indicator device 18B out of the tube so the device 18B and the foam pig fall out the bottom of the tube 16 onto the bottom dome 15 of the reactor 10. A simple visual inspection to see which tubes still have flags 73 sticking out the bottom will indicate which tubes 16 have not been properly cleaned and still need attention. In that case, the indicator device 18B does not have an indicator that can be changed on the device to indicate a second tube condition, but simply the fact that the indicator device 18B is in place or is hot in place provides an indication of the tube condition.

Figure 7A:
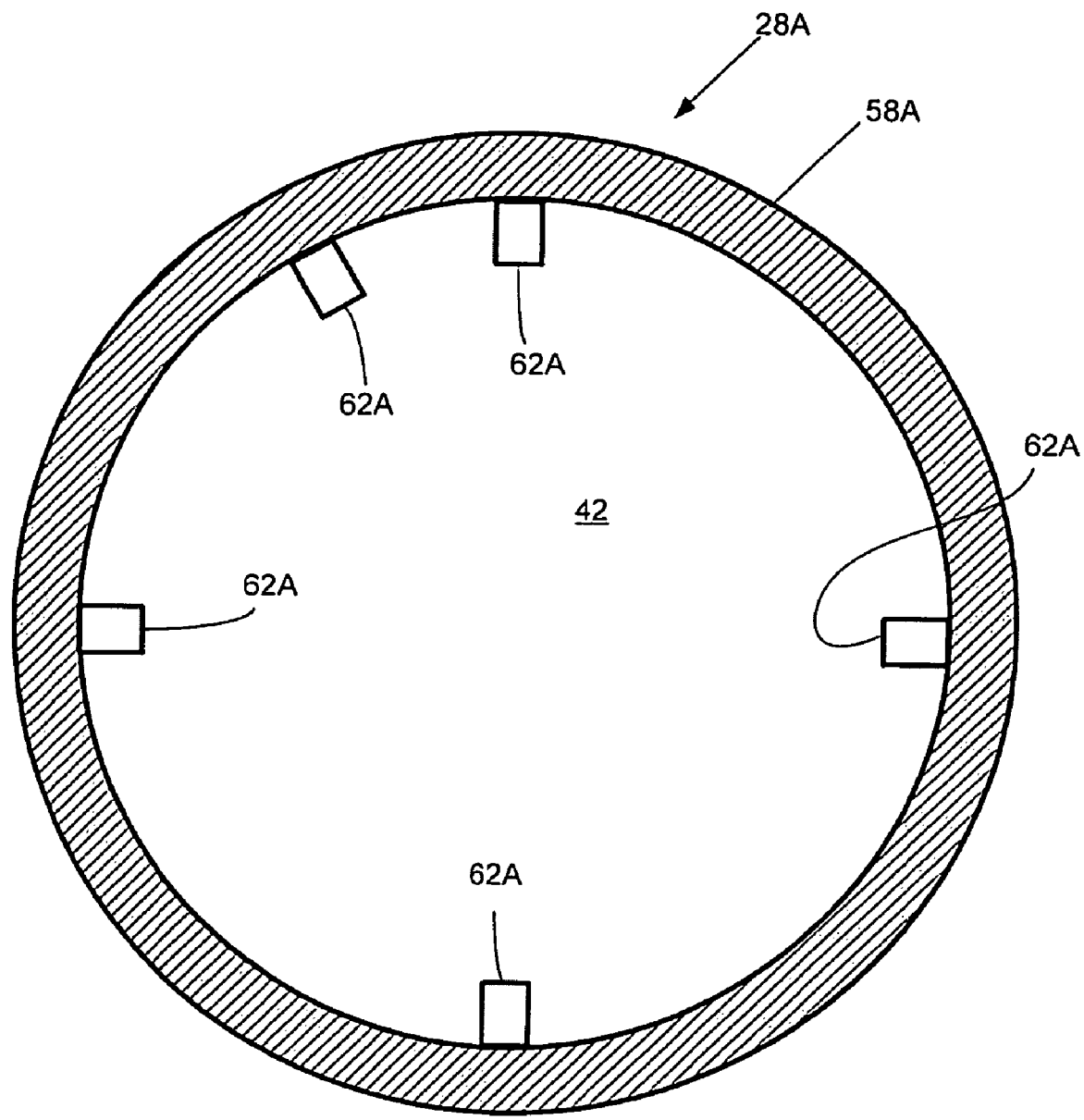
FIG. 7A is a view, similar to that of FIG. 7 but for an alternate embodiment of the cap.

FIG. 7A is a view similar to that of FIG. 7, but for another embodiment of a cap 28A which may be used instead of the cap 28 in the tube indicator device 18A of FIG. 4. Comparing FIGS. 7 and 7A, it may be seen that the continuous annular projection 62 is replaced by a plurality of radially-disposed, discrete projections 62A in the cap 28A. Referring to FIG. 7A, the projections 62A are located at the 12:00 o'clock, 3:00 o'clock, 6:00 o'clock, 9:00 o'clock, and 11:00 o'clock positions, respectively. If the cap 28A is rotated 90 degrees clockwise from its position in FIG. 7A, all of its projections 62A will align to fit inside the notches 52 of the plug 26 (See FIG. 10) allowing the cap 28A to slide right over the head portion 32 of the plug 26 without requiring any part of the cap to expand. However, once assembled, as soon as the cap 28A is rotationally displaced from this aligned condition, and the cap 28A is picked up, the projections 62A impact against the shoulder 54 of the ring 48 of the plug 26, preventing the removal of the cap 28A. This cap 28A is therefore easier to assemble to the plug 26 than the cap 28 of FIG. 7, and it is also easier to disassemble, but only if the projections 62A are properly aligned with the notches 52. The operation of the tube indicator device 18 with the cap 28A is identical to its operation with the cap 28.

Adapter for Larger Diameter Tubes

Figure 13:
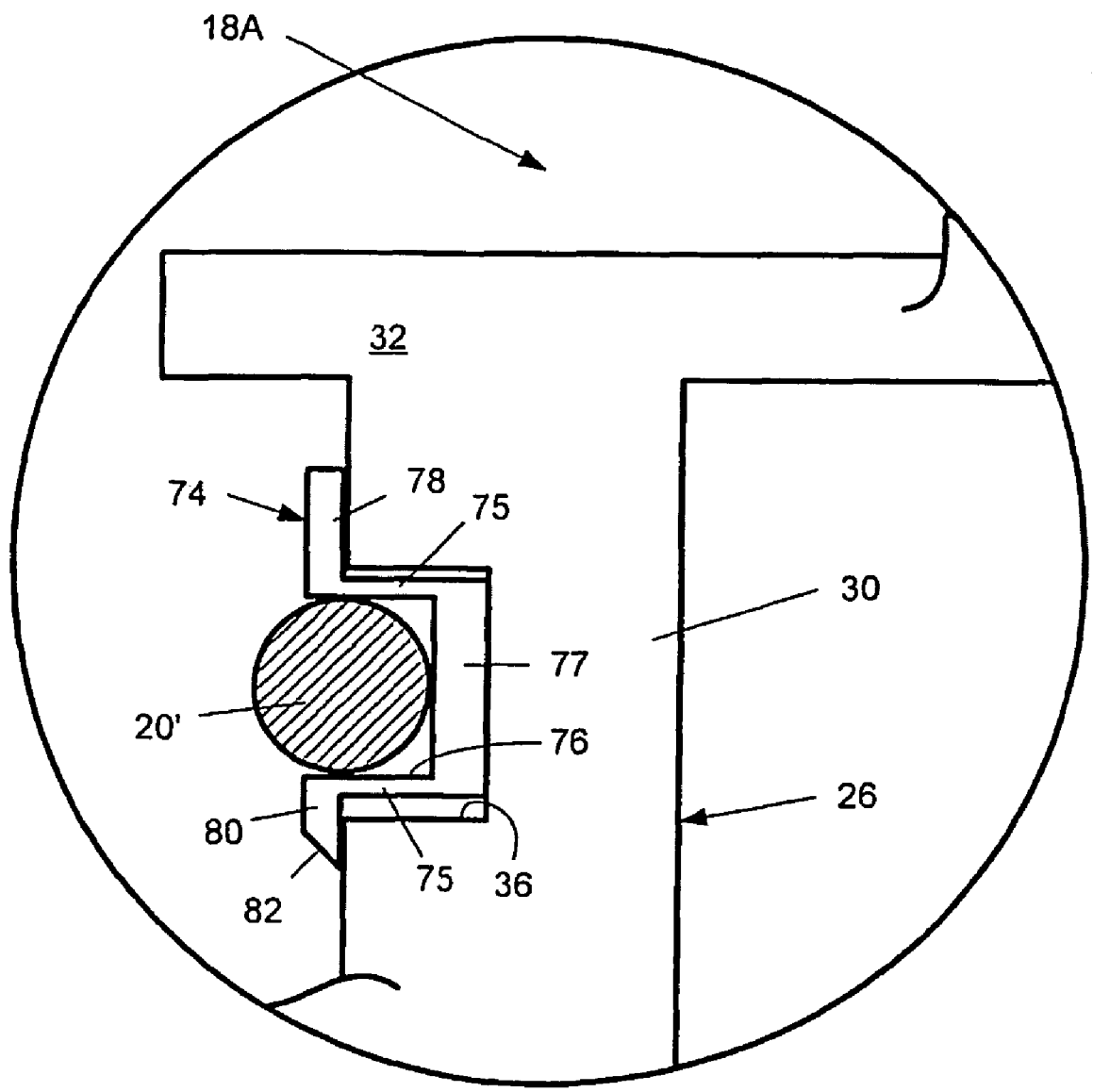
FIG. 13 is a section view of the top, leftmost O-ring groove 36 of the tube indicator device of FIG. 4, but with an O-ring adapter installed in order to accommodate the device to a larger tube diameter.
Figure 14:
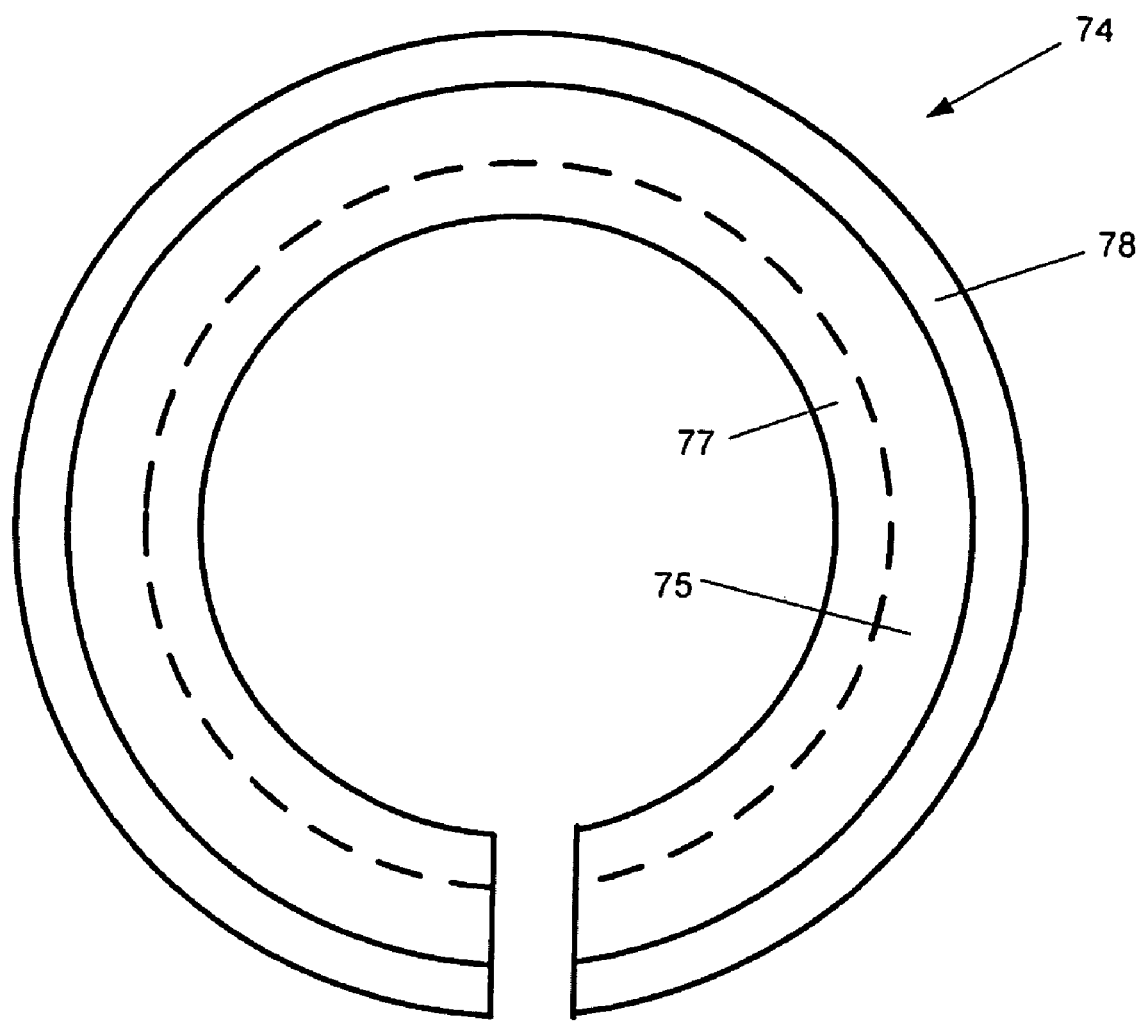
FIG. 14 is a plan view of the O-ring adapter of FIG. 13.

FIGS. 13 and 14 depict an adapter for adapting the tube indicator device 18 of FIG. 3 for use in tubes of slightly larger diameter. A tube indicator device 18 designed to fit, for instance, in a ¾ inch inside diameter tube would most likely work just as well on a slightly larger diameter tube, such as in a ⅞ inch inside diameter tube, especially if the particular embodiment in use requires no O-rings, as is the case for the tube indicator device 18 of FIG. 3. If the difference in the tube diameters is fairly small, as in the above case, it may be a simple matter to replace the size of the O-rings used in an embodiment such as the tube indicator device 18A of FIG. 4 with O-rings of slightly larger cross-sectional diameter to make up the difference in tube diameter size. Thus the O-rings for the tube indicator device 18A may have, for instance, a ¼ inch cross-sectional diameter for use in ¾ inch diameter tubes, but may use O-rings with a 5/16 inch cross-sectional diameter for use in ⅞ inch diameter tubes.

If the difference in the tube diameters is too large to conveniently make up this difference with the use of different sized O-rings, but not so large as to justify the need for a larger tube indicator device 18A, it may be desirable to use an adapter 74, as shown in FIGS. 13 and 14.

The adapter 74 is "C"-shaped in its plan view, as shown in FIG. 14, and has a substantially "U"-shaped cross-sectional shape, as shown in FIG. 13, with the "U" being formed by two parallel legs 75 and a cross-member 77 extending between and connecting the legs 75. It preferably is made from a relatively flexible plastic or metal (such as spring steel) so it may be diametrically opened up enough to allow it to be slid up from the bottom of the plug 26 and then so it will spring back to its original shape when it reaches the notch 36.

The inside diameter of the adapter 74 in its "at rest" position is slightly larger than the diameter of the O-ring notch 36 (and of the other O-ring notches 38, 40, since, in this embodiment, they are all the same). In order to install the adapter 74, the installer opens up the adapter 74 enough for its inside diameter to be slightly larger than the outside diameter of the stem 30 of the plug 26, and then he slides the adapter 74 up from the bottom of the stem 30 to the O-ring notch into which it is to be installed, which, in this case, is the uppermost notch 36.

Once the adapter 74 reaches its O-ring notch 36, it snaps back to its "at rest" position within that notch 36, as shown in FIG. 13. The parallel legs 75 and cross-member 77 then form a new O-ring groove 76 to receive a new O-ring 20'. The adapter 74 also includes an upper ring 78 and a lower ring 80. The lower ring 80 defines a ramped surface 82 to facilitate the installation of the O-ring 20' over the lower ring 80 and into the new O-ring groove 76. The adapter 74 allows the use of a larger diameter O-ring 20' on the tube indicator device 18A, which allows it to be used in a larger diameter tube 16 than that for which it was originally designed. Even if a new O-ring 20' is not installed, the upper and lower rings 78, 80 of the adapter 74 effectively increase the outside diameter of the stem 30, which help it more closely fit a larger reactor tube 16. It may be desirable to use more than one of the adapters 74, such as one in the upper groove 36 and one in the lower groove 40, to help ensure that the tube indicator device 18A remains properly aligned within the larger diameter reactor tube 16.

Figure 17:
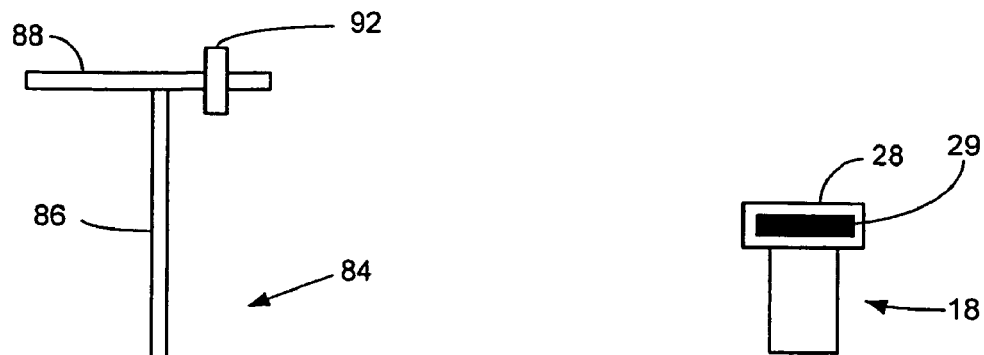
FIG. 17 is a section view of a tube indicator device with a ferro-magnetic insert, which may be used with the plug removal device of FIGS. 15 and 16.

FIGS. 15 through 20 depict a removal device 84 for removing magnetically-attractive tube indicator devices from reactor tubes 16. In order to be magnetically attractive, the plug portion or cap portion, as schematically depicted in FIG. 17, may be made of a ferro-magnetic material or may have a ferro-magnetic material 29 attached to or embedded into it. The removal device 84 includes a substantially vertically oriented, elongated member 86 as in a wand with a handle 88 at its upper end and an electromagnet 90 at its lower end. An on/off switch 92 is advantageously located on the handle 88 for activation/deactivation of the electromagnet 90. A non-magnetic base or spacer 94 helps to maintain a small clearance or distance between the electromagnet 90 and the tubesheet 12.

Figure 15:
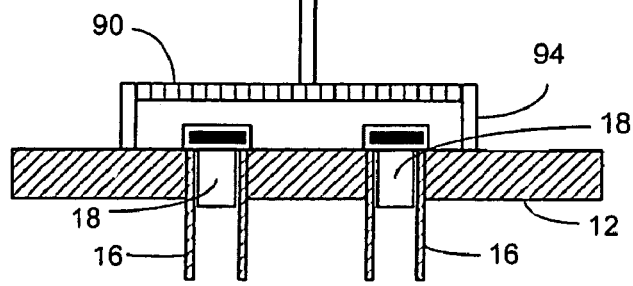
FIG. 15 is schematic, section view of a device for removing magnetically attractive plugs from reactor tubes.
Figure 15:
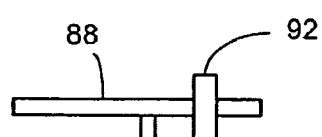
Figure 16:
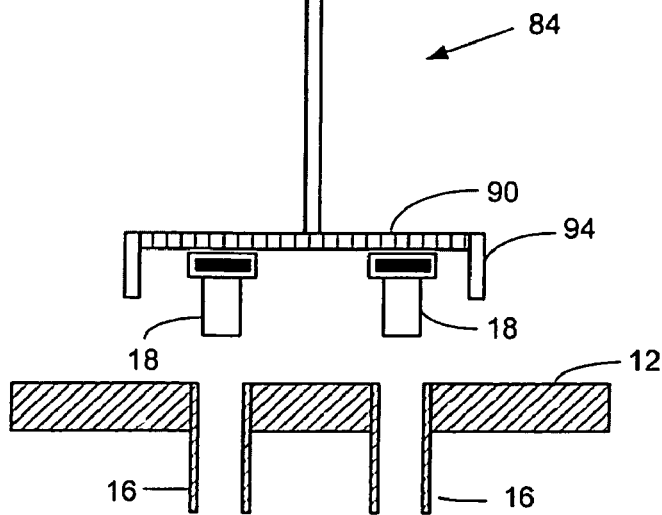
FIG. 16 is a schematic, section view of the device of FIG. 15 having removed the magnetically attractive plugs from reactor tubes.

FIG. 15 shows the removal device 84 placed over two tube indicator devices 18, with the electromagnet 90 in the deactivated mode. The tube indicator devices 18 are resting in their respective tubes 16, and the base 94 is supporting the removal device 84 on the tubesheet 12. In FIG. 16, the electromagnet 90 has been activated, and the force of the electromagnet 90 on the ferro-magnetic material of the tube indicator devices 18 has pulled the tube indicator devices 18 out of their respective tubes 16. In FIG. 16, the removal device 84 is shown already elevated slightly above the tubesheet 12, carrying with it the tube indicator devices 18.

Figure 18:
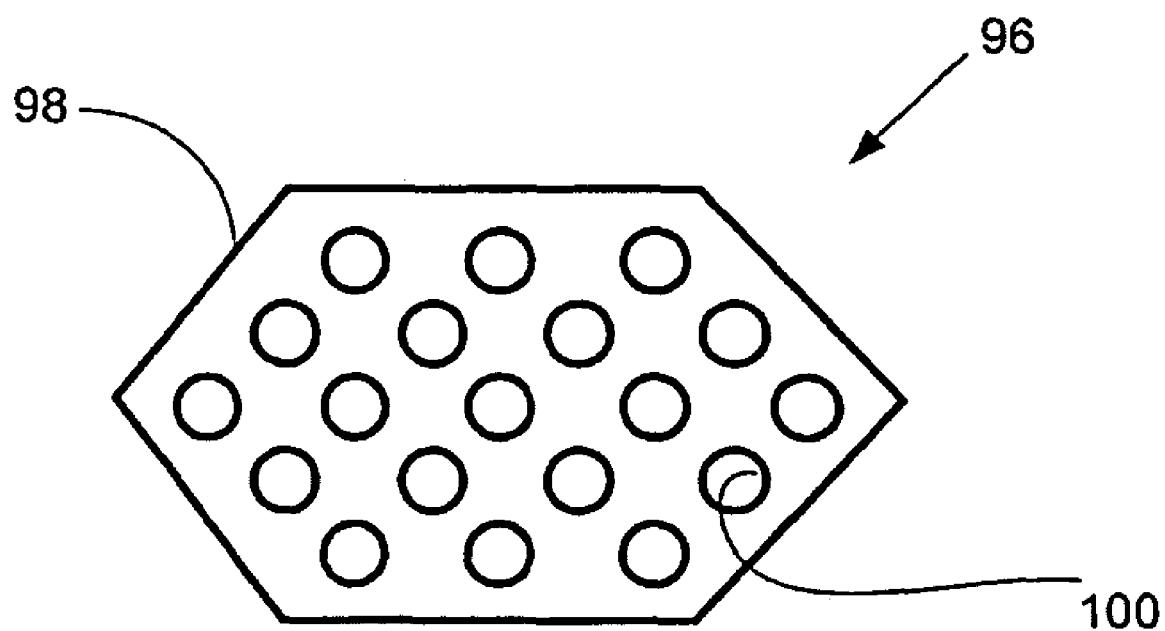
FIG. 18 is a plan view of a staging station which may be used with the plug removal device of FIGS. 15 and 16.

FIG. 18 shows a staging station 96 for the temporary storage of the tube indicator devices 18 before they are installed or after they are removed from the >tubesheet 12. The staging station 96 allows the removal device 84 to pick up or deposit the tube indicator devices 18 in a preferred footprint configuration to facilitate and speed up the re-installation of the tube indicator devices 18 onto the tubesheet 12.

Figure 19:
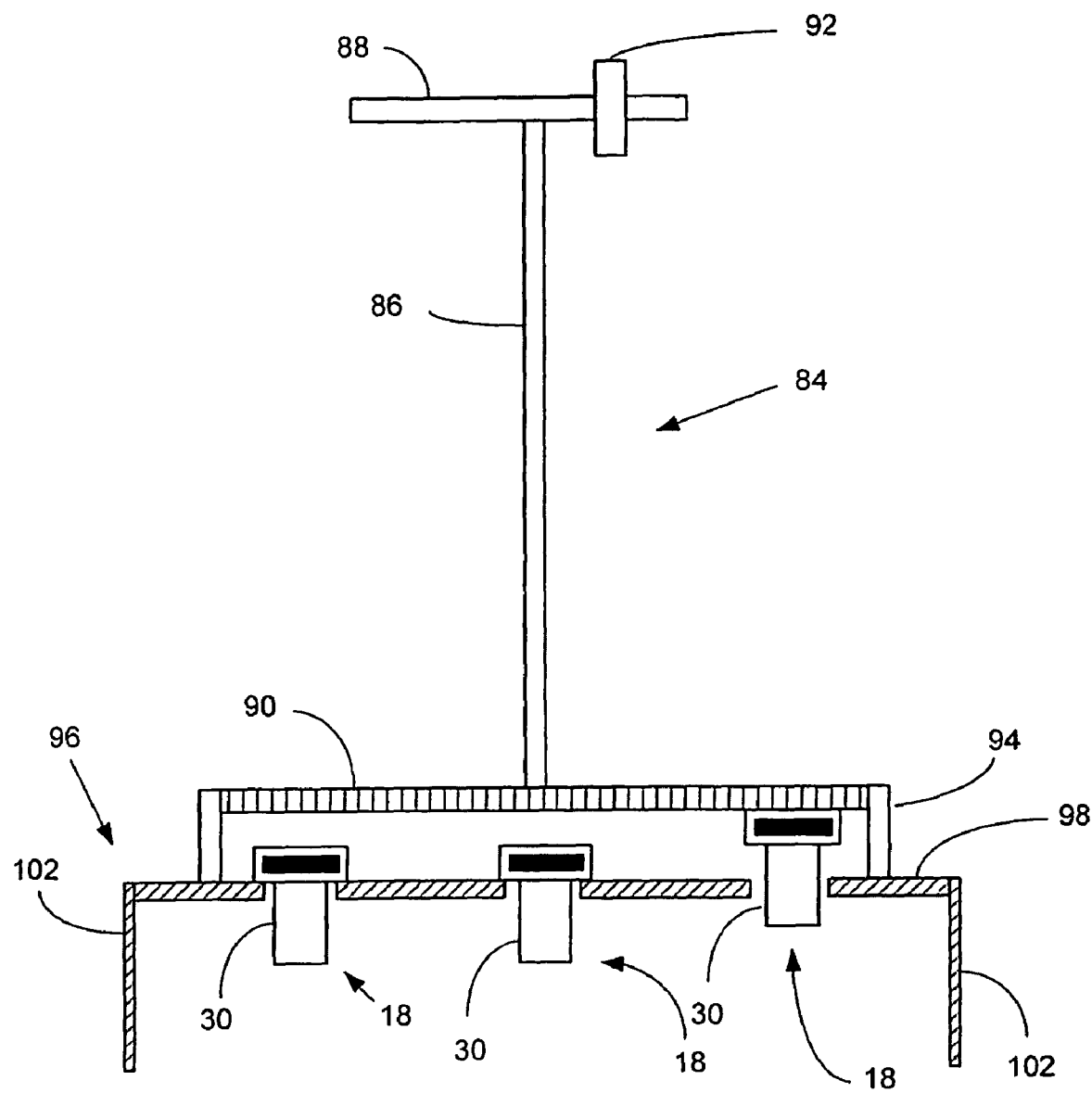
FIG. 19 is a side section view of the staging station of FIG. 18, schematically showing the depositing of a tube indicator plug onto the staging station by the removal device of FIGS. 15 and 16.
Figure 20:
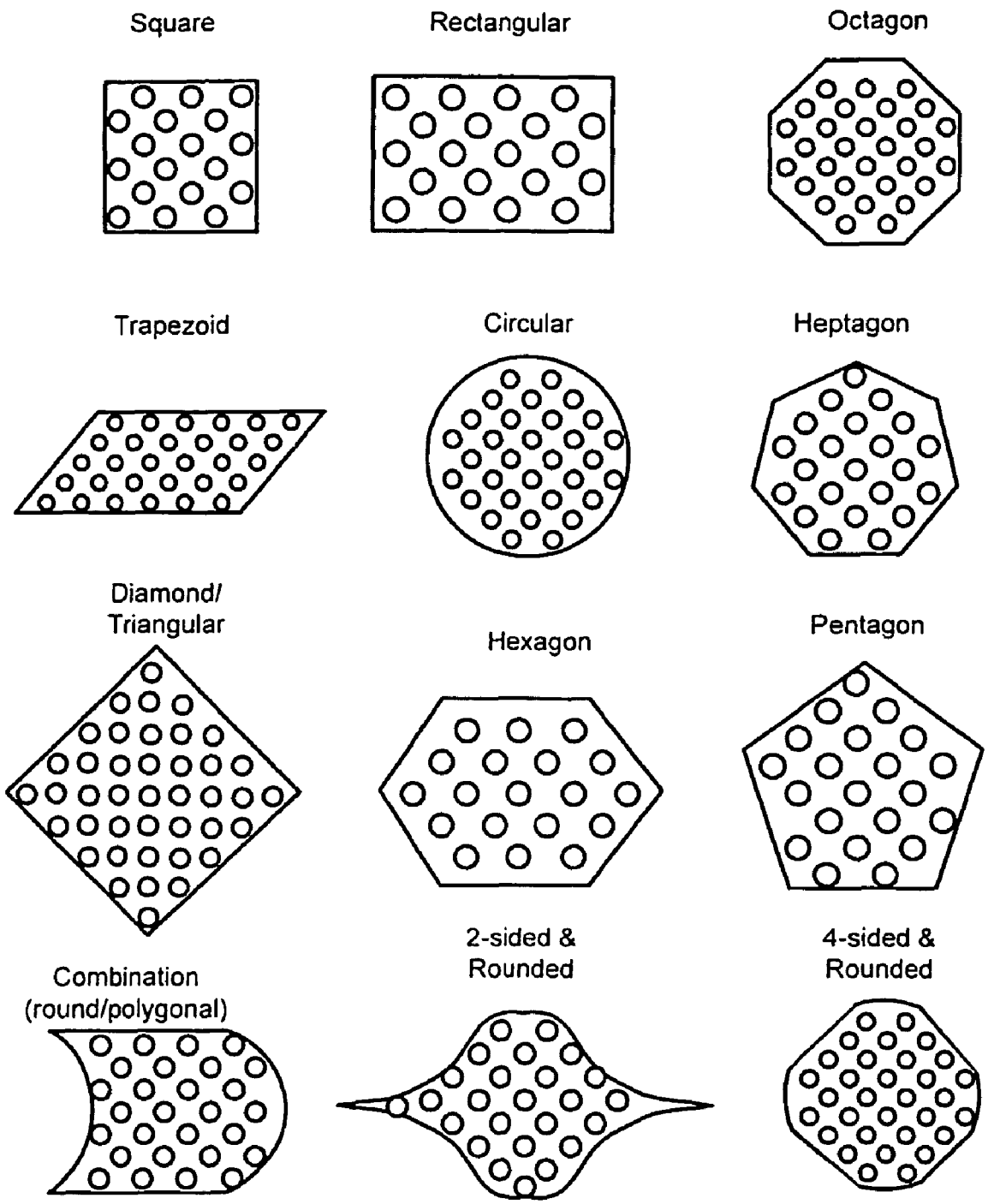
FIG. 20 is a schematic plan view of a plurality of staging stations, similar to that of FIG. 18, but showing a large number of footprint configurations which may be possible.

The staging station 96 is essentially a template including a plate 98 defining a plurality of through openings 100. As shown in FIG. 19, the plate 98 is elevated off of the ground or other support surface by legs 102 to allow the stem portions 30 of the tube indicator devices 18 to slide down through the openings 100. As may be appreciated in FIG. 20, the plate 98 may have any of a number of different footprint configurations, all of them with a plurality of through openings 100 aligned in the triangular pitch configuration to match that of the tubesheet 12.

To use the removal device 84, the tube indicator devices 18 may be initially pre-loaded on a plurality of staging stations 96, preferably with each of the preloaded staging stations 96 stacked on top of each other in an open container (not shown). The open container may have a shape that resembles the footprint configuration of the staging station 96, if desired. For instance, a round plastic bucket may be used to house a stack of staging stations 96 having circular plates. Similarly, a rectangular box may be used to house a stack of staging stations 96 having rectangular plates. This configuration of the open container could then serve to help align the removal device 84 with the template such that the tube indicator devices 18 are consistently picked up by the electromagnet 90 in the same orientation from one staging station 96 to the next. However, other alignment mechanisms could be used, and the container shape does not have to match the shape of the template. Activation of the electromagnet 90 then retracts all the tube indicator devices 18 from the staging station 96 and onto the removal device 84.

The removal device 84 is then placed over the tubesheet 12 such that, when the electromagnet 90 is deactivated, the tube indicator devices 18 are deposited into their respective tubes 16. To facilitate this task, it may be advisable to have means for properly aligning the removal device 84 with the tubes 16 in the tubesheet 12. For instance, the removal device 84 could include two or more tube hole locating pins (not shown) which project downwardly beyond the base 94, such that once at least two of the locating pins are received in tubesheet tubes 16, the removal device 84 is automatically properly oriented to deposit all the tube indicator devices 18 in their respective tubes 16.

The procedure can be reversed in order to quickly remove the tube indicator devices 18 from the tube sheet 12, storing the tube indicator devices 18 in their staging stations 96 (See FIG. 19) which in turn are stacked inside a container which can be readily moved in or out of the reactor head 13 through the manway 17.

The intensity of the magnetic attraction, the height of the base 94, and/or the number or size of the O-rings used in the tube indicator devices 18 may be varied to selectively pick up only those tube indicator devices 18 one wishes to pick up.

As has already been alluded to above, a vacuum removal device 84A, as shown in FIG. 21, may be used instead of a magnetic device. This device utilizes a suction to remove or install a plurality of tube indicator devices 18, 18A. The vacuum device 84A is similar to the magnetic removal device 84, in that it rests on the tube sheet 12 and is aligned with the tubes 16. However, in this case, the removing device 84A has tubular extensions 17A that surround the tube indicator devices 18 and that communicate through a hollow extension 86A and handle 88 to a vacuum line 93, which extends to a vacuum source (not shown). An on-off switch 92A actuates a valve to open and close communication between the vacuum source and the tubular extensions 17A. When the vacuum is actuated, the device 84A lifts tube indicator devices 18 from their respective tubes 16 (or from their fixtures 96), and, when it is turned off, the tube indicator devices 18 will fall down. Alternatively, instead of being connected to a vacuum source, a removal device could have a frame like the magnetic removal device 84 of FIG. 19 with small suction cups on its underside which contact the top surfaces of the tube indicator devices 18.

Additional Embodiments for the Tube Indicator Device

Figure 22:
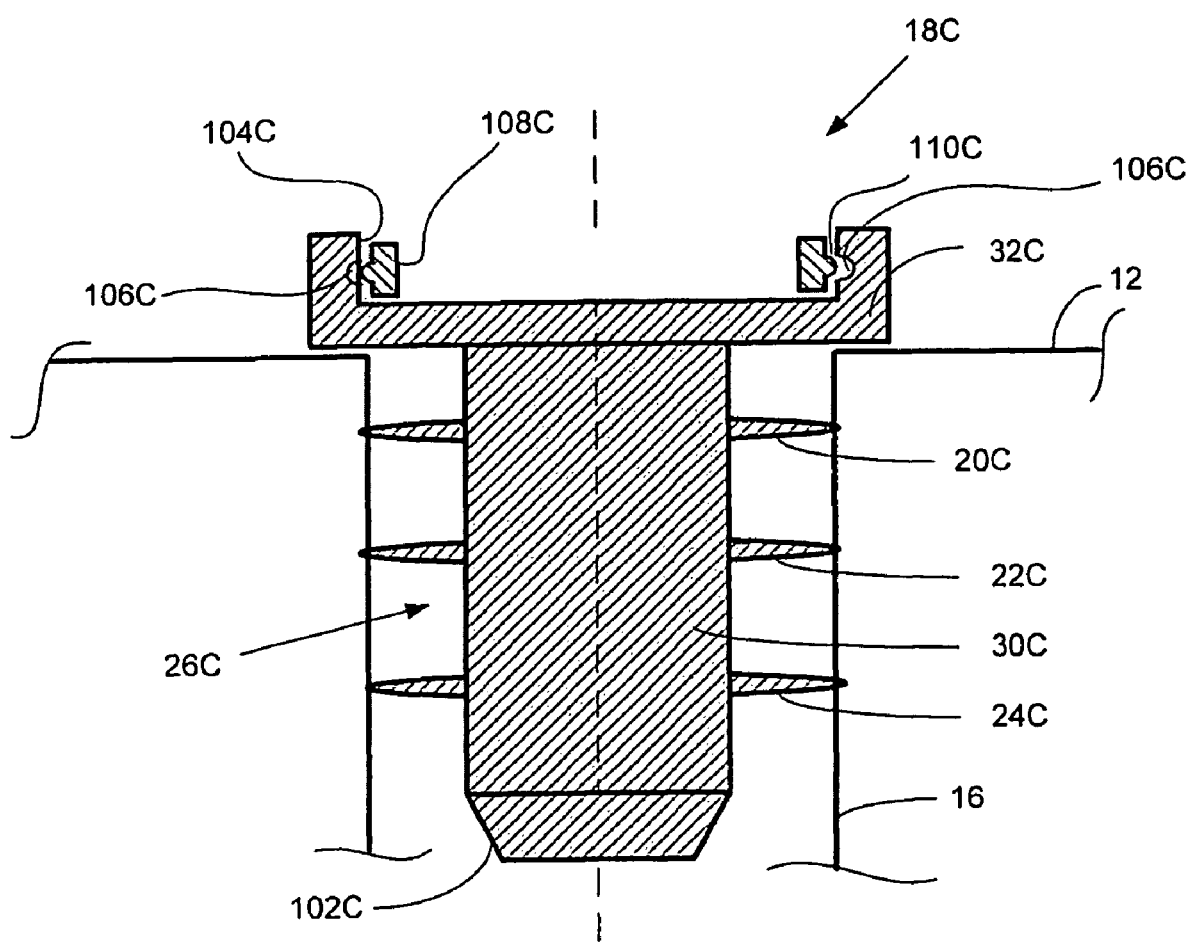
FIG. 22 is a section view of another embodiment of a tube indicator device made in accordance with the present invention.

FIG. 22 depicts another embodiment of a tube indicator device 18C made in accordance with the present invention. It includes a plug 26C and a top ring 108C. The plug 26C includes a stem portion 30G and a closed head portion 32C, which plugs the opening to the tube 16 when the head portion 32C is resting on the tubesheet 12. The stem portion 30C defines a tapered bottom end 102C to facilitate placement of the tube indicator device 18C in the reactor tube 16. The stem portion 30C also defines top, middle, and bottom flattened rings 20C, 22C, and 24C respectively, each with an outside diameter which slightly exceeds the inside diameter of the reactor tube 16 such that the tube indicator device 18C has an interference fit with the tube 16 so it will not readily "pop" out of the tube 16. The length of the stem portion 30C is greater than its outside diameter, and the outside diameter of the head portion 32C is greater than the inside diameter of the tube 16. The rings 20C, 22C, 24C may be made from a more pliable material than the rest of the plug 26C, and/or they may be thin enough to flex more readily than the rest of the plug 26C so that the rings 20C, 22C, 24C wedge a portion of the stem 30C against the tube 16 to provide an effective but releasable grip on the inside of the tube 16.

Figure 23:
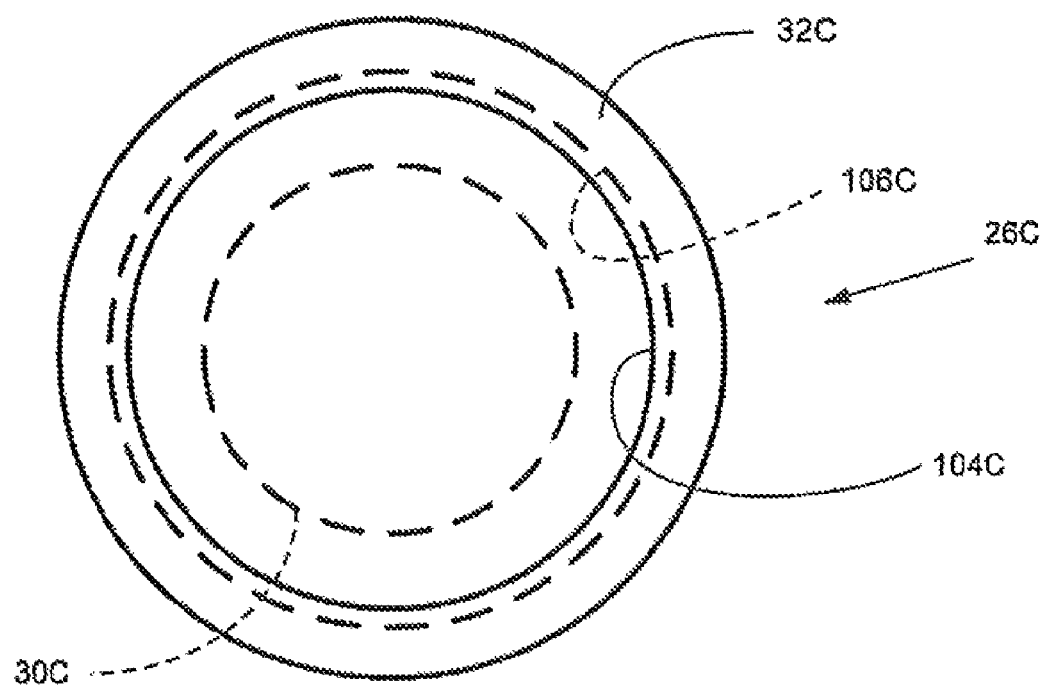
FIG. 23 is a plan view of the cap portion of the tube indicator device of FIG. 22, with the inner ring removed.

The head portion 32C defines an annular recess 104C (See also FIG. 23) open to the top of the head portion 32C. A circumferential indent 106C in the side wall of the annular recess 104C provides a "catch" to releasably secure the ring 108C as described in more detail below.

Figure 24:
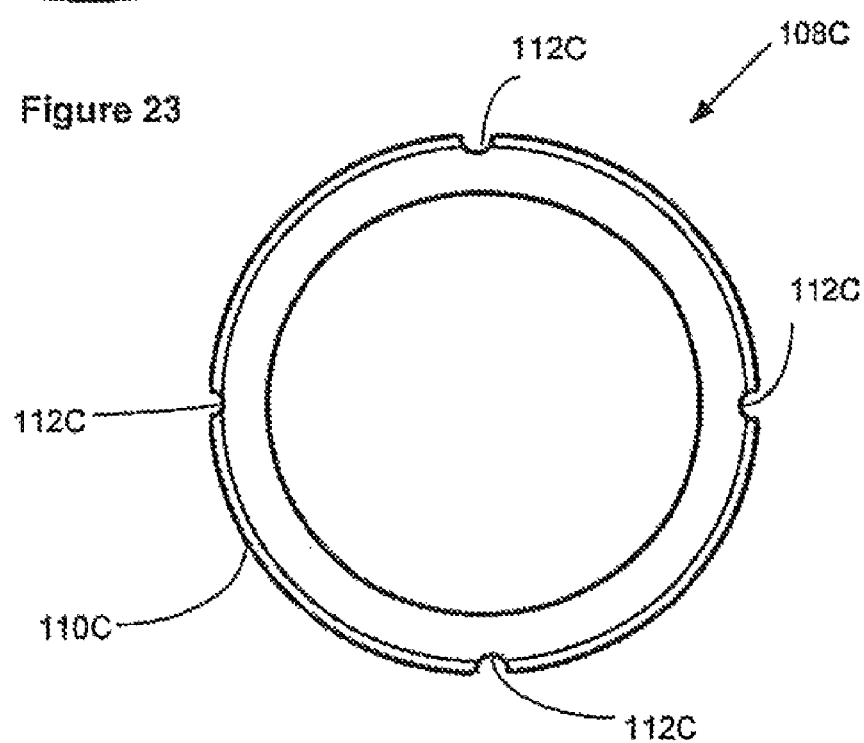
FIG. 24 is a plan view of the inner ring of the tube indicator device of FIG. 22.
Figure 24A:
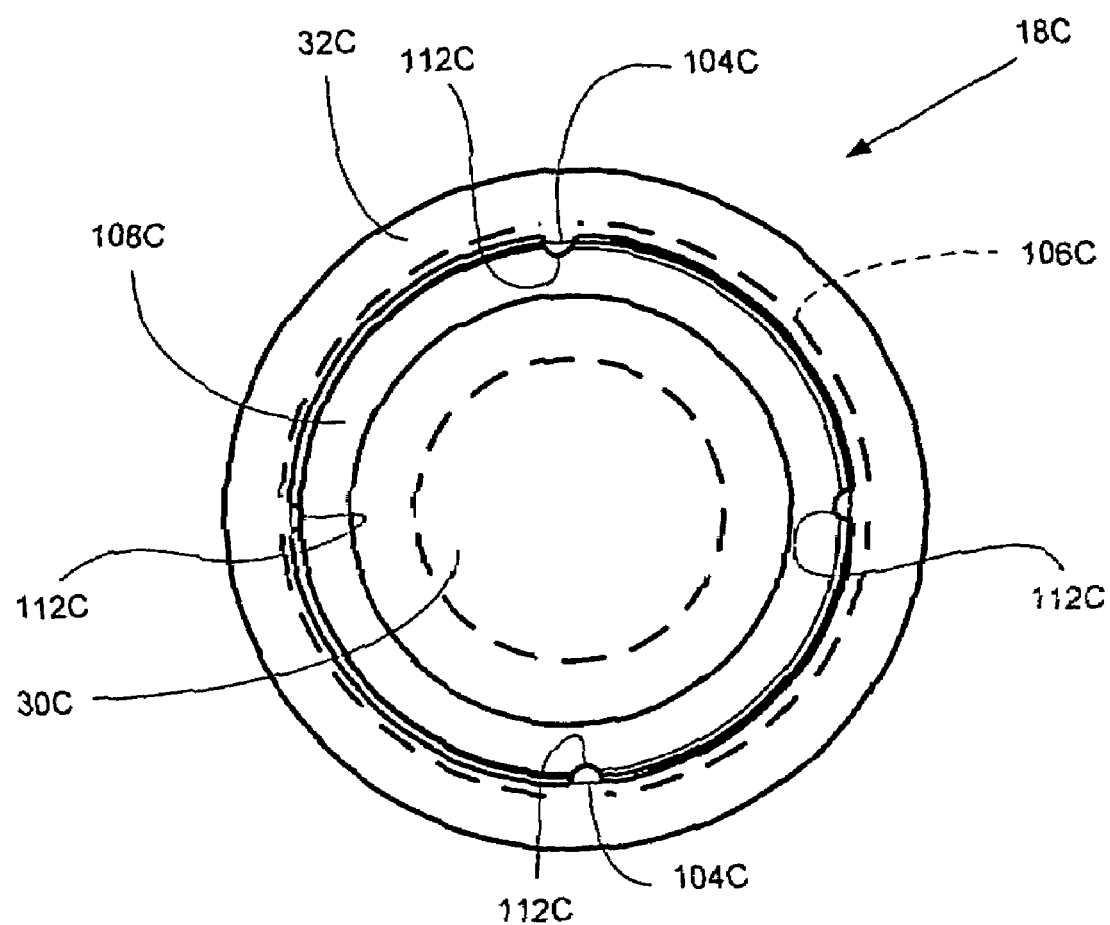
FIG. 24A is a plan view of the tube indicator device of FIG. 22.

Referring briefly to FIGS. 22 and 24, the ring 108C defines an outer circumferential projection 110C designed to snap into the circumferential indent 106C of the head portion 32C to releasably retain the ring 108C in the annular cavity 104C, as seen in FIG. 24A. The ring 108C also defines a plurality of spaced apart, vertically aligned slots 112C at its outer periphery. A tool, such as the end of a flat screwdriver, may be inserted into one of the slots 112C in order to help pry the ring 108C out of the cavity 104C. The rings 108C may be provided in a variety of different colors to help uniquely identify the condition of the tube 16 into which the tube indicator device 18C is inserted.

For instance, tube indicator devices 18C may initially be placed into all the tubes 16 in a reactor without any top ring 108C, to indicate that no data has yet been collected on these tubes. As pressure drop data is collected for each tube 16, a colored ring 108C would be snapped into its corresponding tube indicator device 18C to indicate the status of the tube 16. For example, a green ring 108C may be inserted in the recess 104C if the pressure drop across the tube 16 is within an acceptable range. If the pressure drop is too high, a red ring 108C may be inserted, and a yellow ring 108C may be inserted if the recorded pressure drop is too low. The red-marked and yellow-marked tubes would then be corrected in accordance with a predetermined procedure. After correction, the rings 108C would be removed from the corresponding tube indicator devices 18C (by prying the rings 108C out of the cavity 104C by inserting a tool in one of the slots 112C) and new rings (for instance, blue rings 108C) would be installed to indicate the new status of these tubes (namely, corrected but not yet re-tested). These tubes would then be re-tested and, depending on the results of the tests, each tube could be marked once again with green to indicate the tube passed, red to indicate failed due to high pressure drop, and yellow to indicate failed due to low pressure drop. Of course, additional colors may be used to indicate other conditions. For instance, an orange-colored ring 108C could be used to indicate a tube which again failed due to high pressure drop after the initial correction, and a magenta-colored ring 108C could be used to indicate a tube which again failed due to low pressure drop after the initial correction. Thus, in this tube indicator device 18C, the indicator on the device is changed by removing one colored ring 108C and inserting another.

Also, smaller diameter rings (not shown) could be inserted inside the ring 108C such that the original, outermost ring 108C indicates the initial status of the tube, and a second colored ring inside this ring 108C indicates the subsequent status of the tube without losing the history of the status of the tube. For example, if the tube initially fails due to high pressure drop, a red ring 108G may be installed inside the cavity 1040. After correction (but before re-testing), a smaller, blue ring (not shown) may be inserted inside the outer ring 108C. If, after re-testing, the tube still fails due to high pressure drop, the blue ring may be removed and replaced by an orange colored ring (or alternately, the blue ring may be left in place and a still smaller orange colored ring may be placed inside the blue ring).

FIGS. 25, 25A, 26, and 26A depict another embodiment of a tube indicator device 18D made in accordance with the present invention. It includes an outer insert 26D and a middle insert 108D. The outer insert 26D includes a hollow stem portion 30D and a head portion 32D. The stem portion 30D has a generally cylindrical shape, with a length that is greater than its outside diameter. The stem portion 30D is made up of a plurality of relatively thin and flexible elongated slats 116D, each with a tapered bottom end 102D which cooperates with a similarly tapered bottom end 114D of the middle insert 108D to spread the slats 116D outwardly to wedge them against the tube 16 and lock the tube indicator device 18D into its corresponding tube 16, as described in more detail below.

The head portion 32D of the outer insert 26D defines an annular cavity 104D open to the top of the head portion 32D. It also defines a second, smaller annular opening 117D, inside the larger annular cavity 104D. This second annular opening 117D opens into the interior cavity 118D of the hollow stem portion 30D.

The middle insert 108D includes an insert stem portion 120D and an insert head portion 122D. The insert stem portion 120D is a substantially cylindrical element with a tapered bottom end 114D and the circular disk insert head portion 122D at its top end. In a preferred embodiment, either the tapered bottom end 114D or the insert head portion 122D is a separate piece which is secured (as by welding, gluing or screwing together, for instance) to the insert stem portion 120D after the middle insert 108D has been inserted through the annular opening 117D of the outer insert 26D. The annular opening 117D is large enough to receive the insert stem portion 120D, but too small to receive either the tapered bottom end 114D or the insert head portion 122D, such that, once assembled (as depicted in FIG. 25A), the middle insert 108D is slidably "trapped" within the outer insert 26D.

Figure 25:
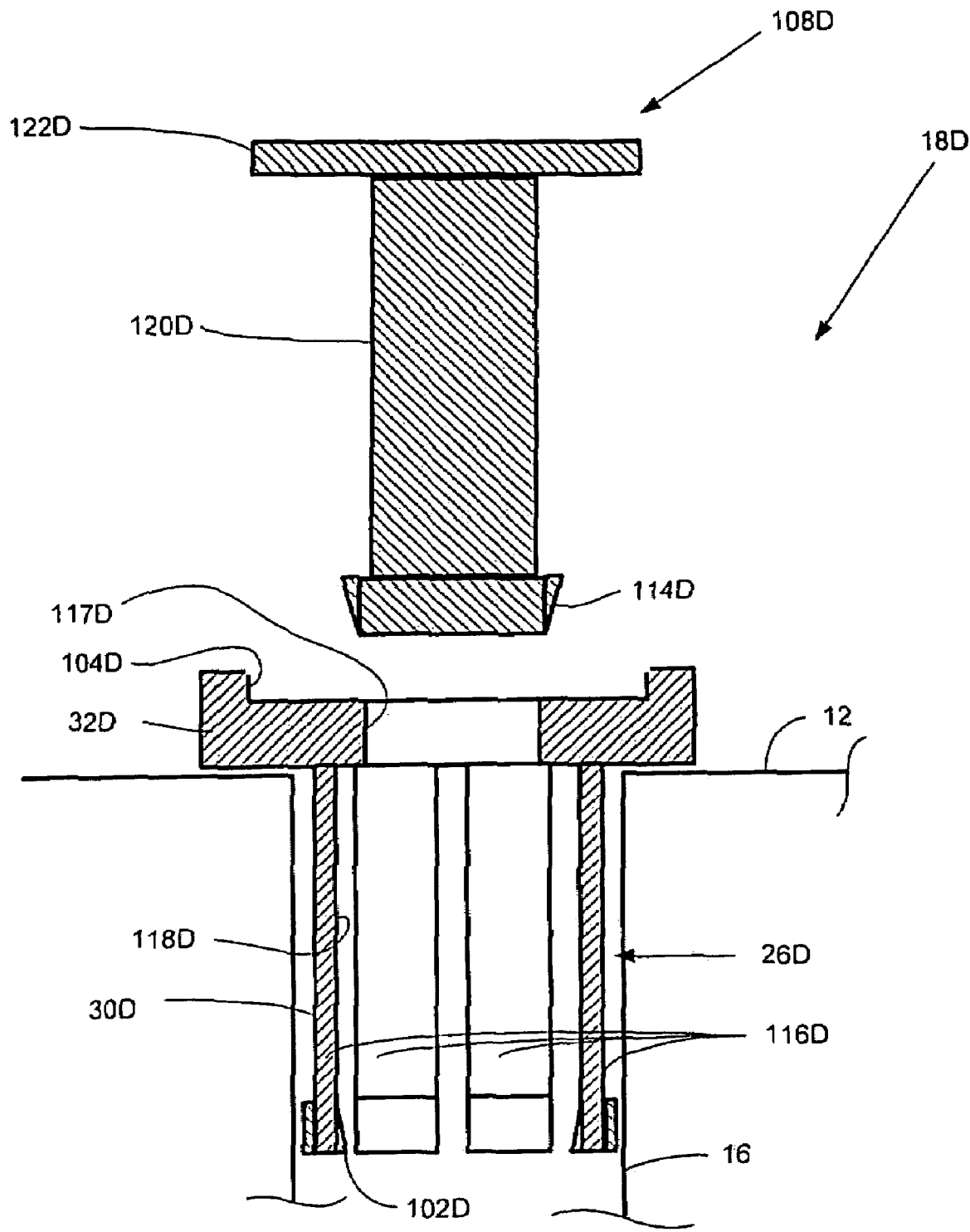
FIG. 25 is a partially exploded, section view of another embodiment of a tube indicator device made in accordance with the present invention.
Figure 25A:
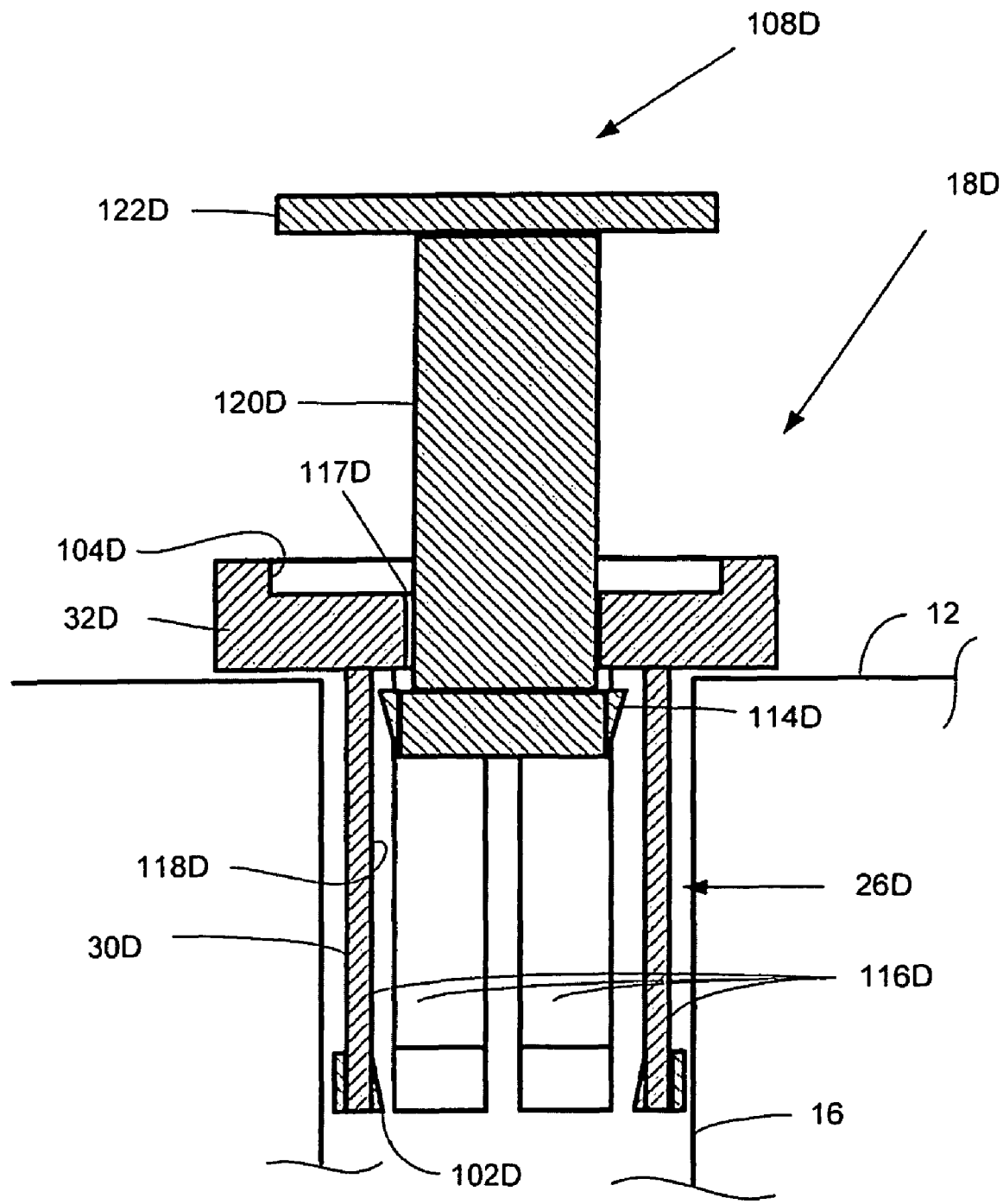
FIG. 25A is a section view, similar to that of FIG. 25, but with the tube indicator device assembled and installed, but not locked onto a reactor tube.
Figure 26A:
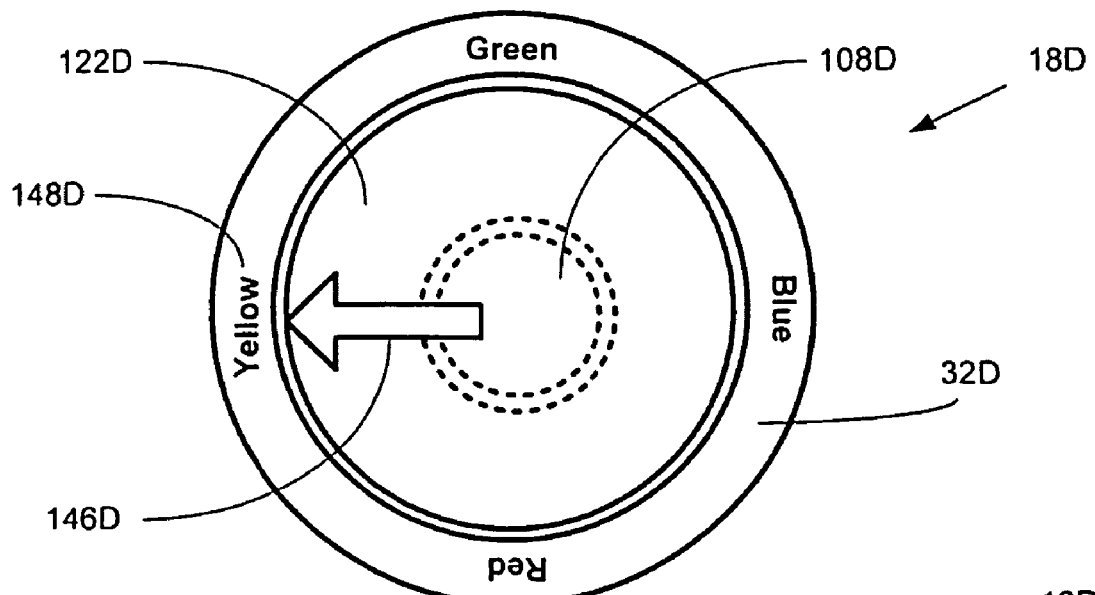
FIG. 26A is a plan view of the tube indicator device of FIG. 26.
Figure 26:
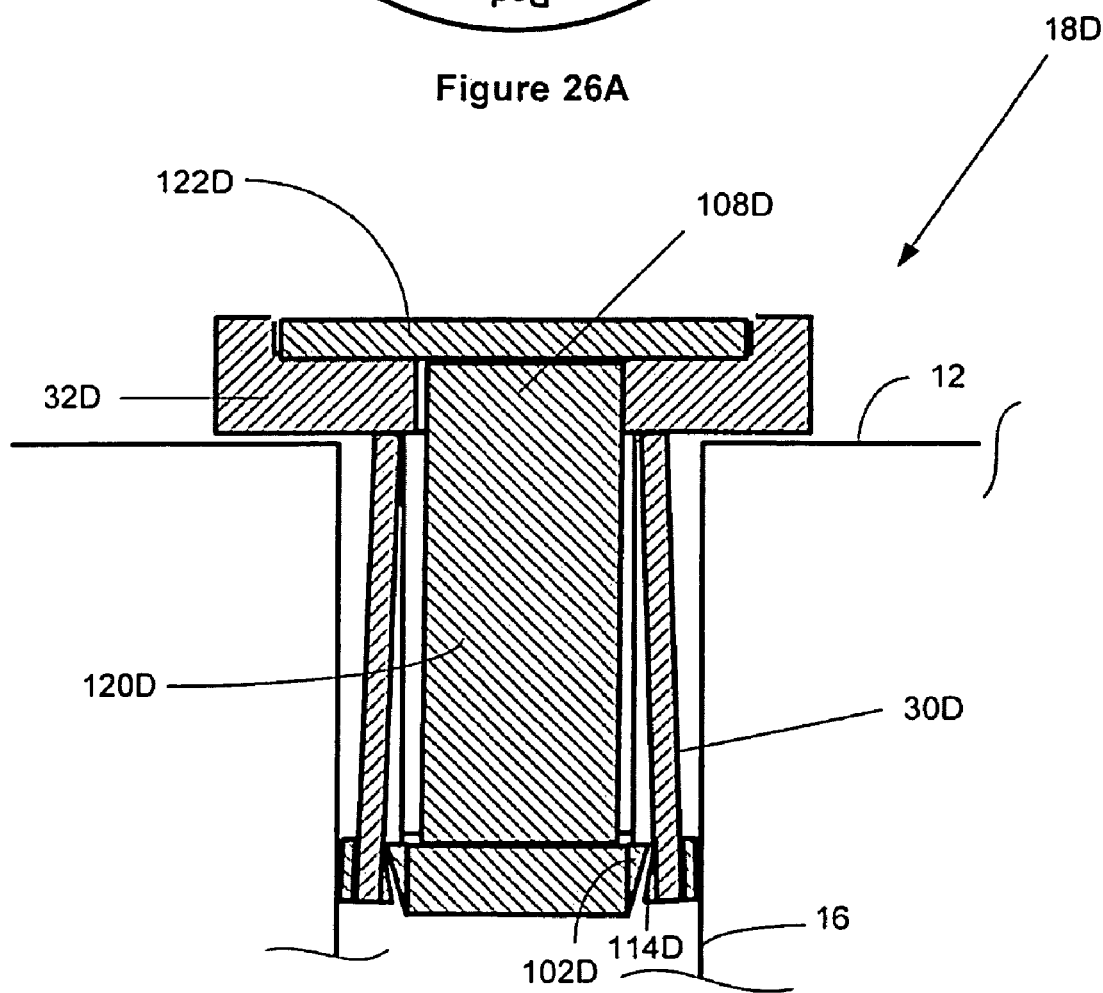
FIG. 26 is a section view of the tube indicator device of FIG. 25, assembled, installed, and locked onto a reactor tube.

Referring briefly to FIG. 26A, the middle insert 108D has an arrow 146D (which may be molded, etched, painted or otherwise secured) on its top surface. Likewise a code 148D such as text (or colors, or shapes, for instance) is located on the top surface of the head portion 32D. When the middle insert 108D is pressed into the outer insert 26D, as described in more detail below and as shown in FIG. 26, the arrow 146D may be aligned such that it points to a specific code location on the head portion 32D, corresponding to the condition of the tube 16. Lifting the middle insert 108D away from the outer insert 26D, to the position shown in FIG. 25A allows the middle insert 108D to be rotated relative to the outer insert 26D.

To use the tube indicator device 18D, the assembled but unlocked tube indicator device 18D (as shown in FIG. 25A) is installed into a reactor tube 16. The head portion 32D rests atop the tubesheet 12 and the stem portion 30D is inserted into the reactor tube 16. The middle insert 108D is then pushed down until the insert head portion 122D fits inside the annular cavity 104D, as shown in FIG. 26, with the insert head portion 122D and the head portion 32D closing off the top of the tube 16 to prevent debris from entering the tube 16. At this point, the tapered bottom end 114D of the middle insert 108D pushes against the tapered bottom ends 102D of the flexible elongated slats 116D, pressing the slats 116D against the wall of the reactor tube 16 so as to expand the stem portion 30D in order to lock the tube indicator device 18D in place. Slots (not shown) similar to the slots 112C in the ring 108C (See FIG. 24) may be incorporated onto the insert head portion 122D of the middle insert 108D, or some other shape may be molded into the head portion 122D to assist the user in the removal of the middle insert 108D so as to release the tube indicator device 18D from the reactor tube 16.

Once the middle insert 108D has been pulled away from its locked position depicted in FIG. 26 to its unlocked position depicted in FIG. 25A, the middle insert 108D may be rotated relative to the outer insert 260 to reposition the indicator to denote a different condition of the tube 16. Thus, in this device, the indicator is changed by lifting, rotating, and reinserting the middle insert 108D to indicate a different tube condition.

In addition to, or instead of, the arrow 146D and the code 148D shown in FIG. 26A, as was the case with the tube indicator device 18C described earlier, the middle insert 108D may either be provided in an assortment of colors to help identify the status of a reactor tube, or the insert head portion 122D may be provided with an internal ring arrangement (not shown) similar to ring 108C of the tube indicator device 18C, wherein these internal rings are provided in an assortment of colors to help identify the status of a reactor tube.

Figure 27:
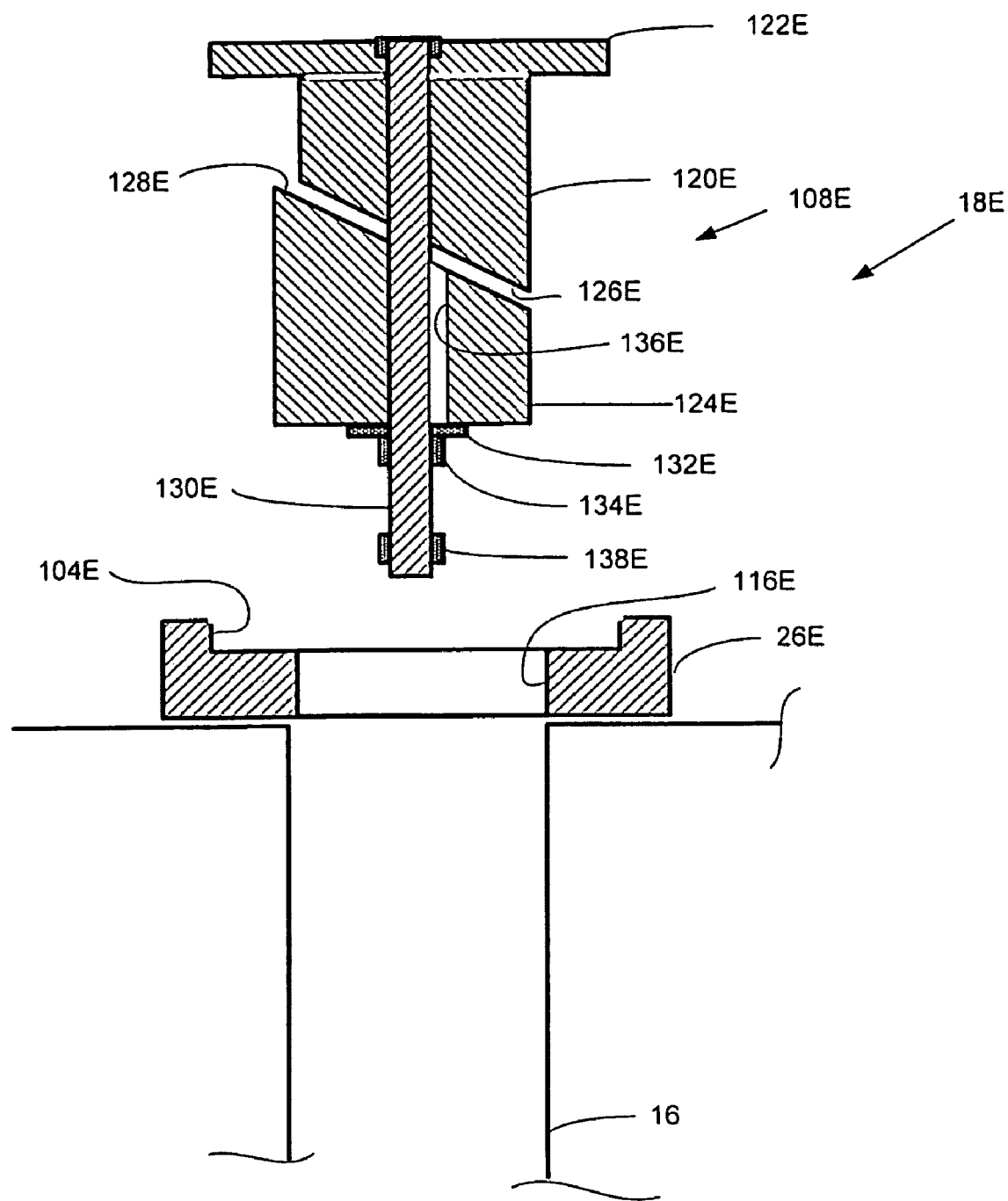
FIG. 27 is a partially exploded, section view of another embodiment of a tube indicator device made in accordance with the present invention.
Figure 28:
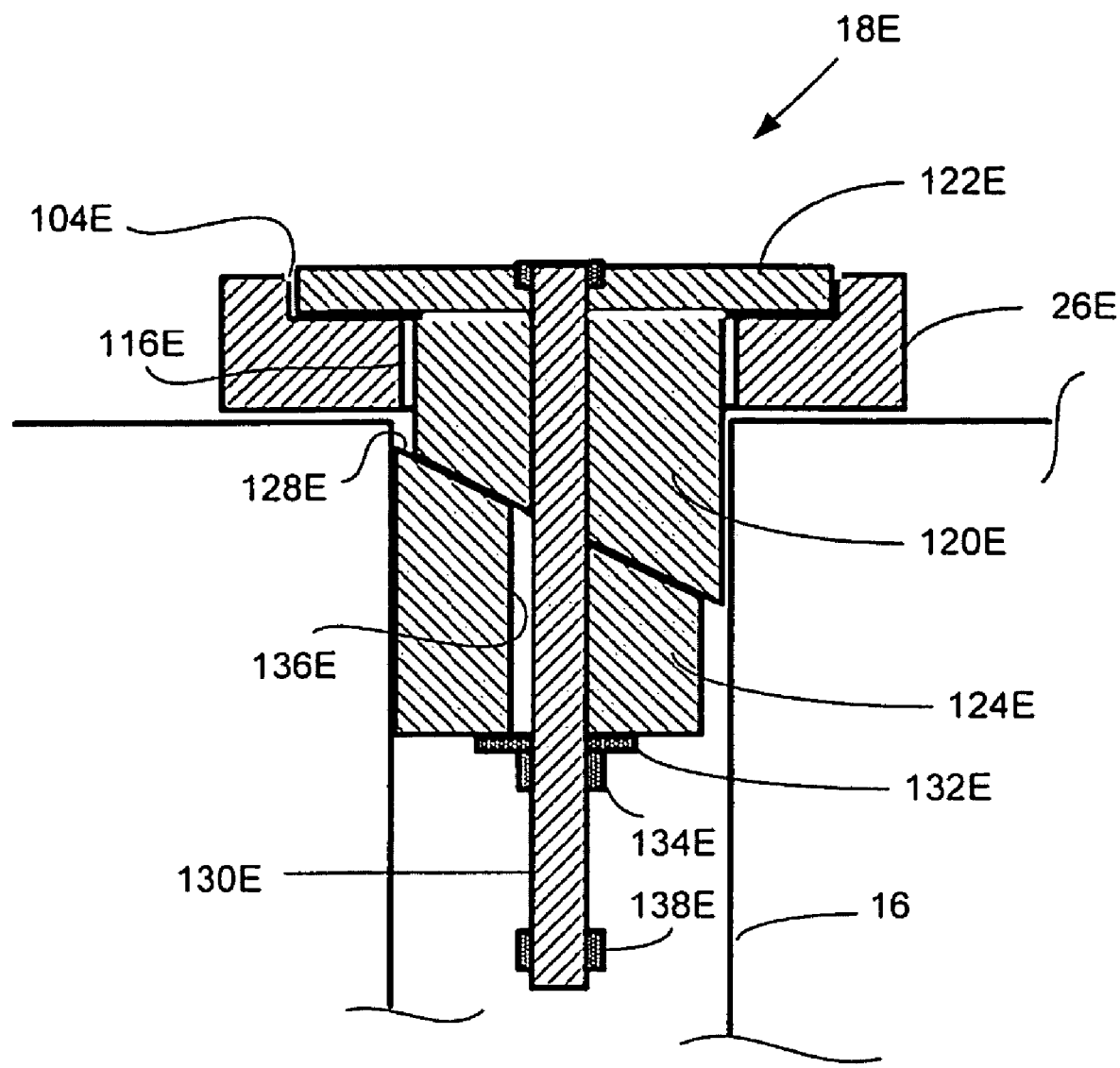
FIG. 28 is a section view of the tube indicator device of FIG. 27, assembled and installed in a reactor tube.

FIGS. 27 and 28 depict another embodiment of a tube indicator device 18E which wedges against the inside of the tube 16. It includes a cap 26E and an insert 108E. The cap 26E defines an annular cavity 104E which is open at the top. It also defines a second, smaller annular through opening 116E, inside the larger annular cavity 104E.

The insert 108E includes a head portion 122E, an upper stem portion 120E and a lower stem portion 124E. These stem portions 120E, 124E are substantially cylindrical elements with angled ends 126E, 128E, respectively. The total length of the two stem portions 120E, 124E is greater than the outside diameter of the lower stem portion 124E and greater than the outside diameter of the upper stem portion 120E. The angled ends 126E, 128E lie at supplementary angles which cooperate with each other to form offsetting ramps which slide past each other to form a wedge when the stem portions 120E, 124E are pulled toward each other as explained in more detail below.

A threaded bolt 130E extends through the head portion 122E as well as through both upper and lower stem portions 120E, 124E. The lower stem portion 124E has a larger outside diameter than the upper stem portion 120E. A washer 132E and a nut 134E are threaded at the bottom of the bolt 130E to secure the lower stem portion 124E to the insert 108E. As may be appreciated from a comparison of FIGS. 27 and 28, the lower stem portion 124E defines an axially-directed, central through-opening 136E to accommodate the bolt 130E, and the diameter of this opening 136E is substantially larger than the diameter of the bolt 130E, which allows the lower stem portion 124E to shift laterally relative to the bolt 130E as the stem portions 120E, 124E are pulled toward each other.

The annular opening 116E in the cap 26E is large enough to accommodate the upper stem portion 120E, but too small to accommodate lower stem portion 124E, such that, once assembled (as depicted in FIG. 28), the insert 108E is slidably "trapped" within the cap 26E. A nut 138E is welded or otherwise permanently secured to the end of the bolt 130E to ensure that the first nut 134E is not accidentally fully unthreaded from the end of the bolt 130E, which would have the undesirable effect of losing the nut 134E, the washer 132E and the lower stem portion 124E down into a reactor tube 16.

To use the tube indicator device 18E, the assembled but not yet tightened tube indicator device 18E is installed into a reactor tube 16. The cap 26E rests on the tubesheet 12 and the insert 108E is inserted into the reactor tube 16, with the head portion 122E fitting inside the annular cavity 104E, so that the cap 26E and the head portion 122E together serve to close off the top opening of the tube 16.

The head of the bolt 130E, which is recessed into the center of the head portion 122E, is then rotated (screwed in) until the lower stem portion 124E insert is pulled up, by the combination of the nut 134E and washer 132E, to the position shown in FIG. 28. The lower stem portion 124E shifts relative to the bolt 130E and relative to the upper stem portion 120E when its ramped end 128E meets up with the corresponding ramped end 126E of the upper stem portion 120E, forming a wedge to expand the stem portion in order to lock the tube indicator device 18E in place inside of the reactor tube 16.

The cap 26E may be provided in an assortment of colors, with one color cap being removed and another inserted to change the indicator on the device to identify first one status and then another status of a reactor tube, or the head portion 122E may be provided with an internal ring arrangement (not shown) similar to ring 108C of the tube indicator device 18C, wherein these internal rings are provided in an assortment of colors and the rings are changed to identify a change in the status of a reactor tube.

Figure 29:
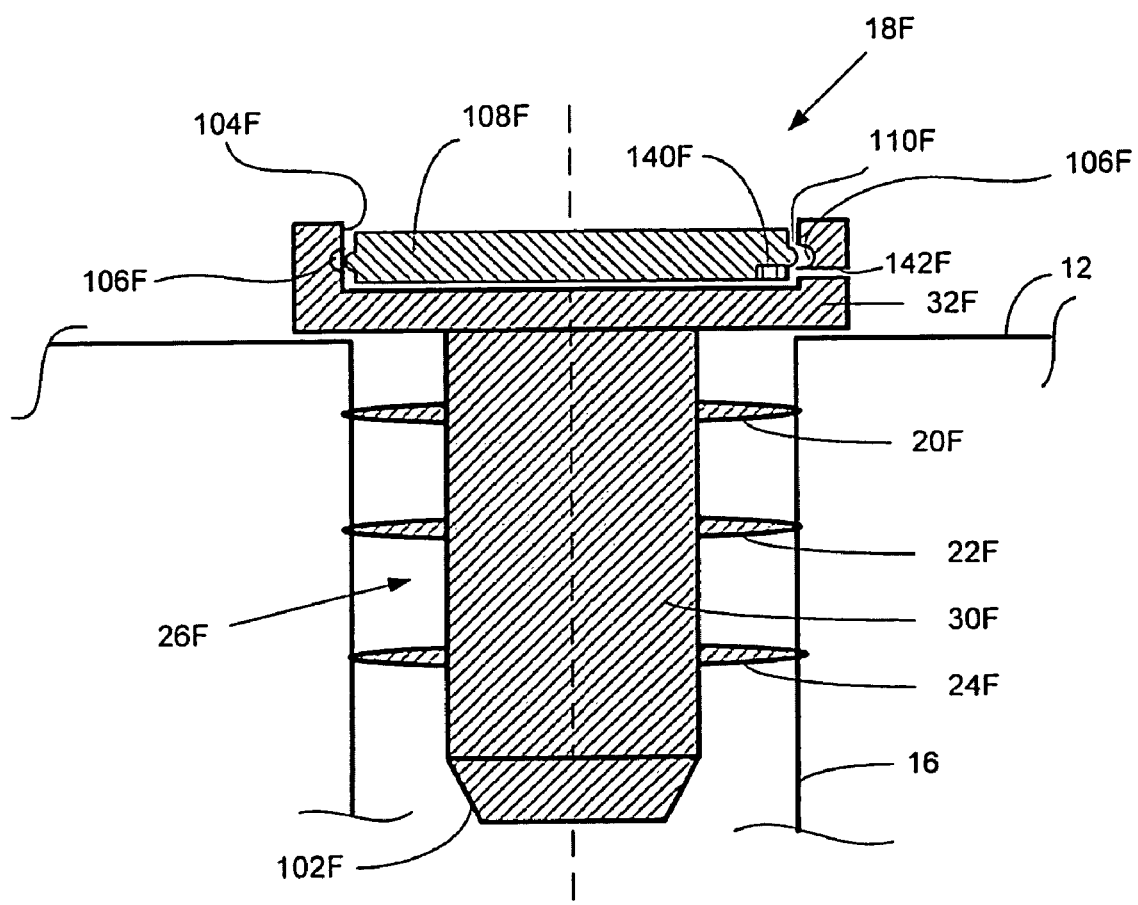
FIG. 29 is a section view of another embodiment of a tube indicator device made in accordance with the present invention.

FIG. 29 depicts another embodiment of a tube indicator device 18F made in accordance with the present invention. Comparing this embodiment 18F in FIG. 29 with the embodiment 18C of FIG. 22, it can be appreciated that they are quite similar. The main difference is that the ring 108C has been replaced by an electrical chip insert 108F as explained in more detail below. The head portion 32F defines a radially-directed through opening 142F through its side wall, which may be used to access an on/off switch on the electronic chip insert 108F as discussed in more detail below. A circumferential indent 106F in the annular cavity 104F provides a "catch" to releasably secure the electrical chip insert 108F as described in more detail below.

Figure 30:
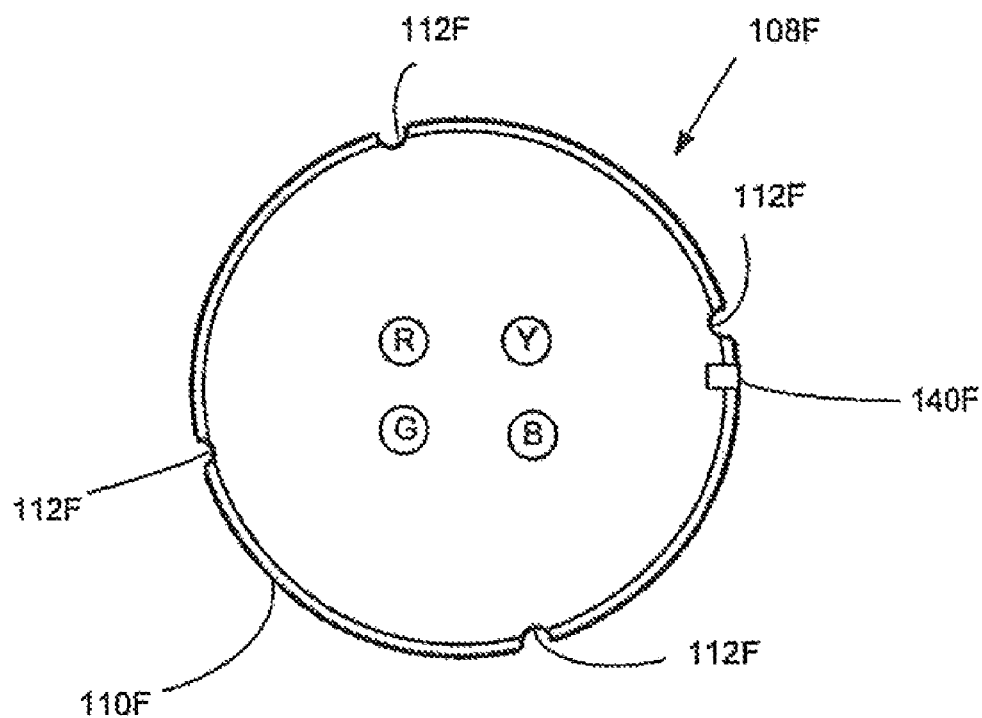
FIG. 30 is a plan view of the electronic chip insert of the tube indicator device of FIG. 29.

Referring to FIG. 30, the electronic chip insert 108F defines an outer circumferential projection 110F which snaps into the circumferential indent 106F of the head portion 32F to releasably retain the electronic chip insert 108F in the annular cavity 104F, as seen in FIG. 29. The electronic chip insert 108F also defines a plurality of spaced apart, vertically aligned slots 112F at its outer periphery. A fool, such as the end of a flat screwdriver, may be inserted in one of the slots 112F in order to help pry the electrical chip insert 108F out of the cavity 104F.

The top of the electronic chip insert 108F includes four lights, labeled R (Red), Y (Yellow), G (Green), and B (Blue). It also includes a pushbutton switch 140F located at one point on the circumference of the insert 108F, and a battery (not shown) located inside the insert 108F, which is electrically connected to the switch 140F and the four lights R, Y, G, B. The switch 140F may be a simple switch which cycles through a pre-set series of actions when it is pressed. For instance, when an operator inserts a tool, such as a flat blade screwdriver, through the opening 142F (See FIG. 29) in the head portion 32F and presses once against the switch 140F, the switch 140F turns on only the Red light R. Pressing against the switch 140F a second time turns off the Red light R and turns on the Yellow light Y. Likewise, a third press on the switch 140F turns on only the Green light G and a fourth press turns on only the Blue light B. Further pressing of the switch 140F may turn on a combination of lights, for instance the Red and the Green lights could both come on when the switch 140F is pressed a fifth time. Further cycling of the switch could turn varying combinations of either two lights lit at once or three lights lit at once, and finally, all four lights lit at once before the cycle starts all over again with all lights out.

Of course, each combination of lights energized or de-energized can be correlated to a particular tube condition. For instance; when the Red and Blue lights are on, this could correspond to a tube which failed initially due to a high pressure drop reading, but on which corrective action has been taken and now awaits further testing to determine if the corrective action taken has resolved the condition. The lights R, Y, B, G are preferably LED (Light Emitting Diode) lights to minimize power consumption. Furthermore, the control for the lights may include a control that causes the lights to flash briefly on and off rather than to remain constantly on, in order to further reduce power consumption.

Figure 31:
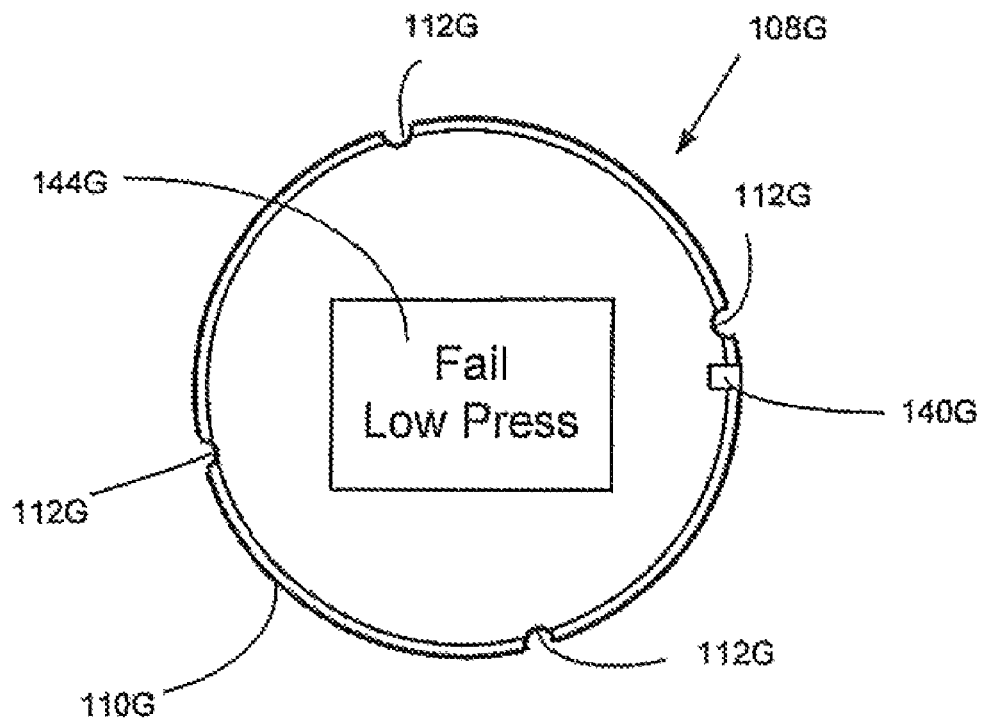
FIG. 31 is a plan view of an alternative electronic chip insert which may be used instead of the insert of FIG. 30.

FIG. 31 depicts another embodiment of a chip insert 108G which may be used instead of the electronic chip insert 108F of FIGS. 29 and 30. The chip insert 108G is an electronic chip which may have a screen 144G to display a message. The message may be a just a color, or an alphanumeric code, or even a text message as shown in FIG. 31. Instead of a screen, the chip insert 108G may have a plurality of lights, such as the array of LED lights of FIG. 30, to indicate the condition of the tube. The chip insert 108G may be turned on and off by pressing on the switch 140G (which may be reached by sliding a tool through the opening 142F in the head portion 32F of the tube indicator device 18F). So, in these electronic embodiments, the indicator is changed by changing the lights that are lit up or changing the display on the screen.

The chip insert 108G also may be connected wirelessly to a control center (not shown) such as a laptop computer, and may include a receiver to receive tube status information from the control center which would be converted by the control on the chip to a particular screen display or light array. In one embodiment, a specific tube indicator device 18F with an electronic chip insert 108G is digitally identified with and inserted into a specific tube 16. Each tube indicator device 18F has an identifying code number, and the control center correlates that code number with the particular tube 16 into which the device 18F is inserted. When the status of the tubes in the reactor has been established and this data has been collected at a remote location (such as at a laptop computer at the site) and is made available in a graphic display, as disclosed in U.S. Pat. No. 6,981,404, which is hereby incorporated herein by reference, then the central controller may transmit data to the individual devices 18F so that each tube indicator device 18F may display an indication of its current tube status.

It should be noted that all the tube indicator devices described herein which include means for being releasably secured to a reactor tube 16 may also be used in the bottom tube sheet 14 of a reactor 10. While the foregoing description may refer to top, bottom, and various directions, it is understood that these directions are relative, and the entire device could be turned upside down or in another direction, so that the top becomes the bottom, and so forth.

It will be obvious to those skilled in the art that various modifications may be made to the embodiments described above without departing from the scope of the present invention as claimed.

What is claimed is:

1. A method for visually indicating a condition of a tube, comprising the steps of:
    inserting a device into the tube, said device including an indicator visible from outside the tube that indicates a first tube condition; and then
    changing the indicator on the device to indicate a second tube condition;
    wherein said device includes a head portion having a larger outside diameter than the inside diameter of the tube, and a stem portion, having a smaller outside diameter than the inside diameter of the tube, with said indicator being on said head portion, wherein the step of inserting the device into the tube includes inserting the stem portion into the tube with the head portion remaining outside of the tube; and further including the step of wedging at least a part of the stem portion against the tube; wherein said wedging step includes the step of expanding said stem portion after it has been inserted into the tube.

2. A method for visually indicating the condition of a tube as recited in claim 1, wherein said step of changing the indicator to indicate a second tube condition includes removing and replacing a portion of the device.

* * * * *

UNITED STATES PATENT AND TRADEMARK OFFICE
CERTIFICATE OF CORRECTION

PATENT NO.        : 8,063,778 B2                           Page 1 of 1
APPLICATION NO.   : 12/248281
DATED             : November 22, 2011
INVENTOR(S)       : Clifford L. Johns et al.

It is certified that error appears in the above-identified patent and that said Letters Patent is hereby corrected as shown below:

Column 2, line 5, delete "but" and insert therefor --out--.
Column 2, line 19, delete "art" and insert therefor --an--.
Column 3, line 9, delete "ah" and insert therefor --an--.
Column 11, line 56, delete "hot" and insert therefor --not--.
Column 13, line 34, delete ">".
Column 15, line 55, delete "108G" and insert therefor --108C--.
Column 15, line 56, delete "1040" and insert therefor --104C--.
Column 16, line 66, delete "260" and insert therefor --26D--.
Column 18, line 32, delete "fool" and insert therefor --tool--.

Signed and Sealed this
Tenth Day of January, 2012

David J. Kappos
*Director of the United States Patent and Trademark Office*